United States Patent
Ogino et al.

(10) Patent No.: US 7,666,537 B2
(45) Date of Patent: Feb. 23, 2010

(54) FUEL CELL SYSTEM FOR PREVENTING HYDROGEN PERMEABLE METAL LAYER DEGRADATION

(75) Inventors: Shigeru Ogino, Toyota (JP); Satoshi Aoyama, Susono (JP); Yasuhiro Izawa, Mishima (JP); Satoshi Shiokawa, Fuji (JP); Takashi Shimazu, Nagoya (JP); Hiroshi Aoki, Nagoya (JP); Hiroyuki Mitsui, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 308 days.

(21) Appl. No.: 10/588,218

(22) PCT Filed: Feb. 17, 2005

(86) PCT No.: PCT/JP2005/002970

§ 371 (c)(1),
(2), (4) Date: Aug. 2, 2006

(87) PCT Pub. No.: WO2005/083822

PCT Pub. Date: Sep. 9, 2005

(65) Prior Publication Data

US 2007/0128484 A1 Jun. 7, 2007

(30) Foreign Application Priority Data

Feb. 26, 2004 (JP) ............... 2004-051445

(51) Int. Cl.
*H01M 2/02* (2006.01)
*H01M 8/12* (2006.01)
(52) U.S. Cl. ............... 429/34; 429/24; 429/25
(58) Field of Classification Search ............ 429/20, 429/24, 12, 40
See application file for complete search history.

(56) References Cited

U.S. PATENT DOCUMENTS

| 3,148,089 | A | 9/1964 | Oswin |
| 7,160,638 | B1 | 1/2007 | Duebel et al. |
| 7,261,960 | B2 * | 8/2007 | Standke et al. ............. 429/20 |
| 2004/0043277 | A1 | 3/2004 | Ito et al. |

FOREIGN PATENT DOCUMENTS

| CN | 1301408 A | 6/2001 |
| GB | 1033362 | 6/1966 |

(Continued)

*Primary Examiner*—Dah-Wei D Yuan
*Assistant Examiner*—Zachary Best
(74) *Attorney, Agent, or Firm*—Oliff & Berridge, PLC

(57) ABSTRACT

A technology for preventing degradation of a hydrogen permeable metal layer in a fuel cell 210 is provided. A fuel cell system 200 including a fuel cell 210 with an anode which has the hydrogen permeable metal layer comprises a fuel cell controller 230 for controlling the operation status of the fuel cell system 200, a temperature parameter acquisition section for acquiring a temperature parameter of the hydrogen permeable metal layer, and a hydrogen permeable metal layer degradation prevention section which reduces the hydrogen partial pressure in an anode channel 212 for supplying fuel gas to the anode. If a temperature of the hydrogen permeable metal layer represented by the temperature parameter deviates from a specified temperature range, the fuel cell controller 230 cause the hydrogen permeable metal layer degradation prevention section to operate for preventing degradation of the hydrogen permeable metal layer.

9 Claims, 14 Drawing Sheets

FOREIGN PATENT DOCUMENTS

| | | |
|---|---|---|
| JP | A-63-032867 | 2/1988 |
| JP | A-04-345762 | 12/1992 |
| JP | 05299105 A * | 11/1993 |
| JP | A-05-299105 | 11/1993 |
| JP | 2001223017 A * | 8/2001 |
| JP | A-2003-095608 | 4/2003 |
| JP | A-2004-146337 | 5/2004 |

* cited by examiner

FUEL CELL SYSTEM FOR PREVENTING HYDROGEN PERMEABLE METAL LAYER DEGRADATION

TECHNICAL FIELD

The present invention relates to a fuel cell system comprising fuel cell with a hydrogen permeable metal layer, and to a technique for preventing degradation of the hydrogen permeable metal layer in a fuel cell.

BACKGROUND ART

In a fuel cell system using reformed gas produced from a hydrocarbon reforming material as fuel, the reformed gas is purified to decrease the carbon monoxide (CO) in the reformed gas. The purification of reformed gas is carried out by a purifier such as a hydrogen purifier with a hydrogen permeable membrane and a selective oxidation part incorporated in the reformer. To avoid complication of the fuel cell system entailed by incorporation of such a purifier, JP05-299105 discloses a fuel cell with a hydrogen permeable metal layer on the electrolyte layer in which unpurified reformed gas can be used as fuel.

However, when hydrogen permeable metal is exposed to hydrogen at low temperatures, the hydrogen permeable metal absorbs the hydrogen and it causes hydrogen embrittlement. On the other hand, when fuel cell reactions proceed at high temperatures, the increase in temperature causes metal diffusion in the hydrogen permeable metal layer. In a fuel cell with a hydrogen permeable metal layer, if hydrogen is supplied when the temperature of the hydrogen permeable metal layer is outside a certain temperature range, the hydrogen permeable metal layer degrades, potentially damaging the product life of the fuel cell.

DISCLOSURE OF THE INVENTION

An object of the present invention is to prevent degradation of the hydrogen permeable metal layer in a fuel cell.

According to an aspect of the present invention, a fuel cell system comprises: a fuel cell having an electrolyte, a cathode provided at one side of the electrolyte, an anode with a hydrogen permeable metal layer provided at the other side of the electrolyte, a cathode channel for supplying oxidizing gas to the cathode, an anode channel for supplying fuel gas containing hydrogen to the anode; a hydrogen permeable metal layer degradation prevention section configured to reduce a partial pressure of hydrogen in the anode channel for preventing degradation of the hydrogen permeable metal layer; a temperature parameter acquisition section configured to acquire a parameter relating to a temperature of the hydrogen permeable metal layer; and a fuel cell controller for controlling an operation state of the fuel cell system, wherein the fuel cell controller has a degradation prevention mode for causing the hydrogen permeable metal layer degradation prevention section to operate when a temperature of the hydrogen permeable metal layer represented by the temperature parameter deviates from a predetermined temperature range.

According to this arrangement, when a temperature of the hydrogen permeable metal layer deviates from a predetermined temperature range, hydrogen partial pressure in the anode channel is reduced. As a result, degradation of the hydrogen permeable metal layer is prevented.

According to another aspect of the invention, a fuel cell system comprises: a fuel cell having an electrolyte, a cathode provided at one side of the electrolyte, an anode with a hydrogen permeable metal layer provided at the other side of the electrolyte, a cathode channel for supplying oxidizing gas to the cathode, an anode channel for supplying fuel gas containing hydrogen to the anode; a hydrogen permeable metal layer degradation prevention section configured to prevent degradation of the hydrogen permeable metal layer by adjusting a temperature of gas supplied to the fuel cell; a temperature parameter acquisition section configure to acquire a parameter relating to a temperature of the hydrogen permeable metal layer; and a fuel cell controller for controlling an operation state of the fuel cell system, wherein the fuel cell controller has a degradation prevention mode for causing the hydrogen permeable metal layer prevention section to operate when a temperature of the hydrogen permeable metal layer represented by the temperature parameter deviates from a predetermined temperature range.

According to this arrangement, when a temperature of the hydrogen permeable metal layer deviates from a predetermined temperature range, temperature of the hydrogen permeable metal layer is able to be restored to the predetermined temperature range.

According to another aspect of the invention, a fuel cell system comprises: a fuel cell having an electrolyte, a cathode provided at one side of the electrolyte, an anode with a hydrogen permeable metal layer provided at the other side of the electrolyte, a cathode channel for supplying oxidizing gas to the cathode, an anode channel for supplying fuel gas containing hydrogen to the anode; and a low temperature gas supply section for supplying gas whose temperature is lower than an operating temperature of the fuel cell to the fuel cell; wherein the low temperature gas supply section includes a low temperature gas heating section configured to prevent degradation of the hydrogen permeable metal layer due to cooling by the low temperature gas by heating the gas within a range not reaching an operating temperature of the fuel cell.

According to this arrangement, a local temperature drop in the hydrogen permeable metal layer is suppressed. As a result, degradation of the hydrogen permeable metal layer due to the local temperature drop is prevented.

The present invention may be realized in a variety of modes, such as a control device or method for a fuel cell system, a vehicle equipped with such a control device, a computer program for effectuating the functions of such a control device or control method, recording medium for recording such a computer program, and the like.

BEST MODES OF CARRYING OUT THE INVENTION

Embodiments of the present invention are described in the following sequence.

A. Embodiment 1:

B. Embodiment 2:

C. Embodiment 3:

D. Embodiment 4:

E. Embodiment 5:

F. Embodiment 6:

G. Embodiment 7:

H. Embodiment 8:

I. Embodiment 9:

J. Variants:

A. Embodiment 1

Figure 1:
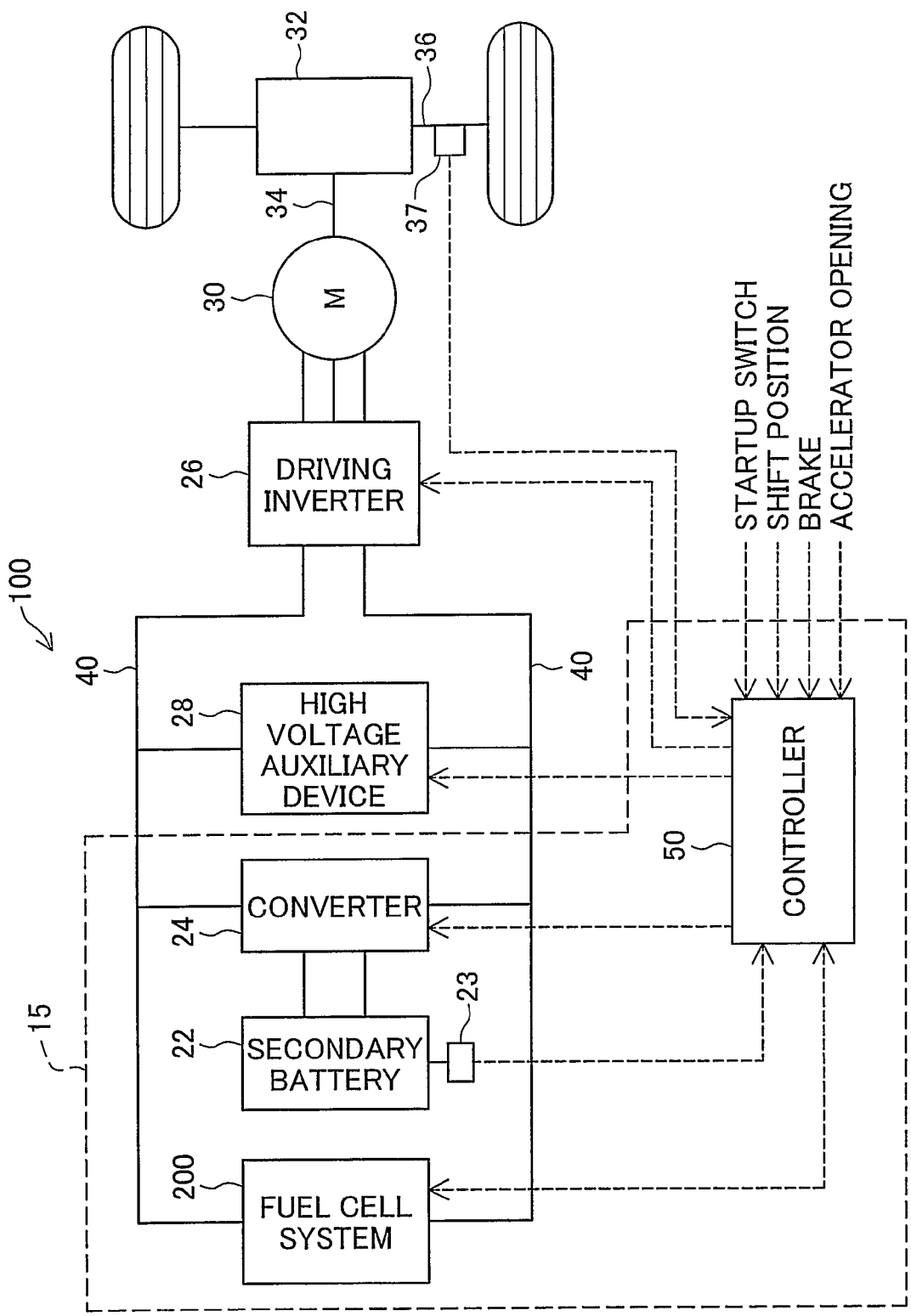
FIG. 1 is a schematic illustration of an electric automobile as an embodiment of the invention.

FIG. 1 is a schematic illustration of an electric automobile as an embodiment of the invention. An electric automobile 100 comprises a power supply system 15. The power supply system 15 is connected to a driving inverter 26 and a high voltage auxiliary 28 through a wiring 40. A drive motor 30 connected to the driving inverter 26 is for generating thrust for the electric automobile 100. The drive motor 30 and the high voltage auxiliary 28 are loads of the power supply system 15.

The power supply system 15 comprises a fuel cell system 200 and a secondary battery 22. The secondary battery 22 is connected to the wiring 40 through a DC/DC converter 24. Thus the DC/DC converter 24 and the fuel cell 210 are connected to the wiring 40 in parallel.

The secondary battery 22 supplies electrical power to drive the parts in the fuel cell system 200 at starting of the fuel cell system 200, and also supplies electrical power to the loads until warming up of the fuel cell system 200 is complete. Also, if available electrical power supply of the fuel cell 210 is inadequate, the secondary battery 22 supplies the lacking electric power. The secondary battery 22 is provided with a state-of-charge monitor 23 for detecting the state-of-charge (SoC) of the secondary battery 22. An SoC meter which integrates charge/discharge current value of the secondary battery 22 in time or a voltage sensor may be used as the state-of-charge monitor 23.

The DC/DC converter 24 adjusts the voltage of the wiring 40, which is an output side of the converter 24, by setting the target voltage. Adjusting the voltage of the wiring 40, which is the output voltage of the fuel cell 210 adjusts the output electrical power from the fuel cell 210.

The drive motor 30 is a synchronous motor comprising three phase windings for forming a rotating magnetic field. The electrical power from the power supply system 15 is converted to three-phase alternating current by the driving inverter 26. The three-phase alternating current then supplied to the drive motor 30. The output shaft 34 of the drive motor 30 is connected to the vehicle drive shaft 36 through the deceleration gear 32. A vehicle speed sensor 37 is provided at the vehicle drive shaft 36.

The high voltage auxiliary 28 uses unconverted electric power supplied by the power supply system 15. The supply voltage is 300 V or higher. An air pump to supply air to the fuel cell 210 and a pump for providing reforming material may be used, for example, as the high voltage auxiliary 28. Such a device is included in the fuel cell system 200, though it is indicated in FIG. 1 as a high voltage auxiliary 28 outside the power supply system 15. The high voltage auxiliaries 28 also include devices comprised in the electric automobile 100 such as an air conditioner.

The electric automobile 100 further comprising a controller 50. The controller 50 is configured as a microcomputer with a CPU, ROM, RAM, timer, and the like. Input signals acquired by the controller 50 include those outputted by the state-of-charge monitor 23 described above, and those outputted by the vehicle speed sensor 37. In addition, signals such as signals indicating start switch "on" and "off" state, the shift position, foot brake "on" and "off" state and accelerator opening of the electric automobile 100 are inputted to the controller 50. Having acquired such a signal, the controller 50 executes various control process, and outputs drive signals to the DC/DC converter 24, parts of the fuel cell system 200, the driving inverter 26, the high voltage auxiliary 28, and the like.

Figure 2:
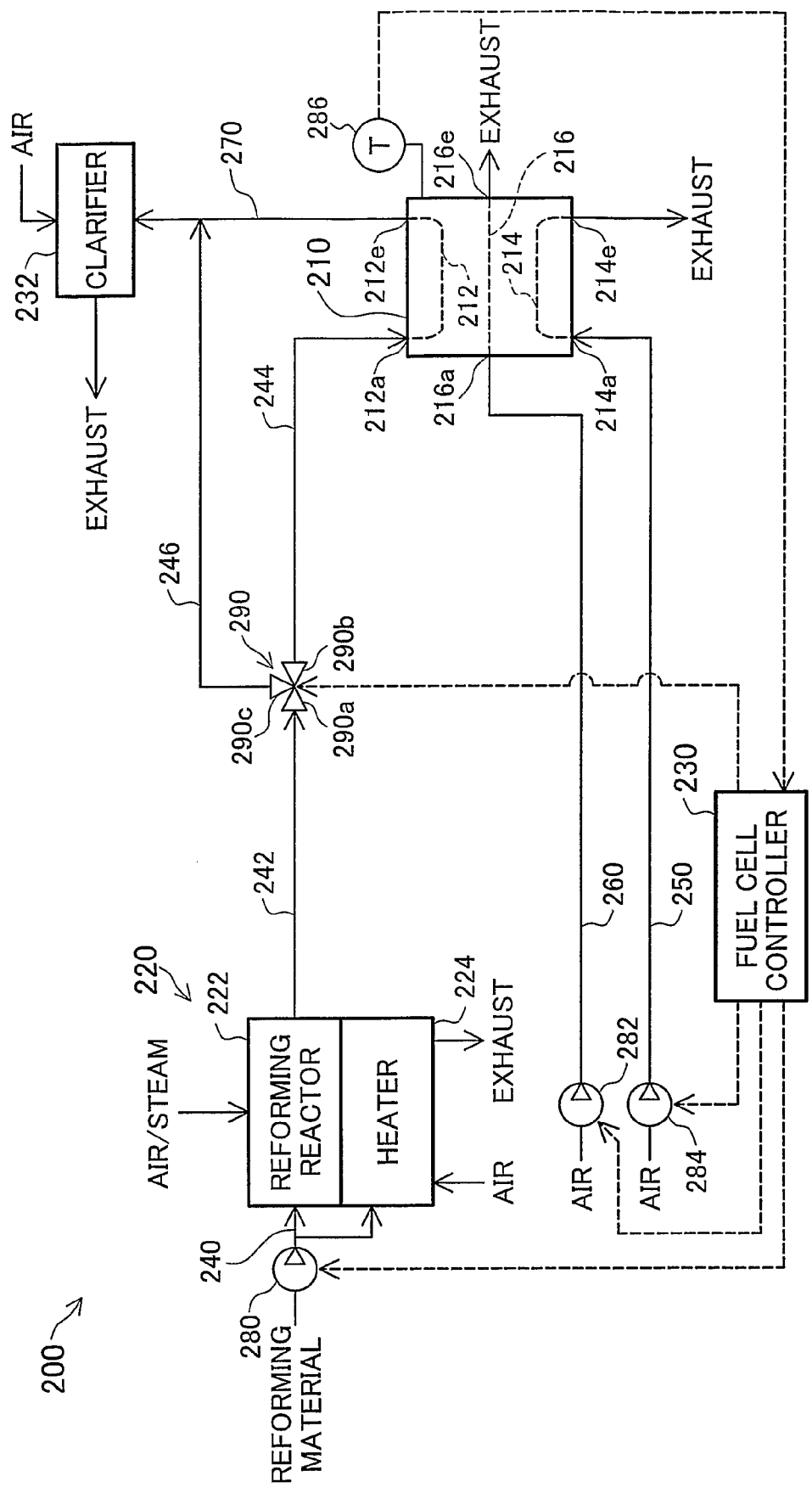
FIG. 2 is a schematic illustration showing the arrangement of the fuel cell system 200 in embodiment 1.

FIG. 2 is a schematic illustration showing the arrangement of the fuel cell system 200 in embodiment 1. The fuel cell system 200 comprises a fuel cell controller 230, fuel cell 210, reformer 220, and a clarifier 232.

The fuel cell 210 includes an anode channel 212, a cathode channel 214, and a coolant gas channel 216. Generally, the fuel cell 210 is configured as a fuel cell stack which comprises layered multiple single cells (described below) having an anode, a cathode and an electrolyte. However, in FIG. 2 the fuel cell is illustrated to be a single cell for the sake of drawing expediency.

The fuel gas introduced to the anode channel 212 contains hydrogen as a fuel, and the oxidizing gas introduced to the cathode channel 214 contains oxygen as oxidant. The hydrogen and oxygen are supplied to anodes and cathodes in the single cell respectively and consumed by fuel cell reactions. Fuel gas in which the hydrogen concentration has dropped due to fuel cell reactions is exhausted from the fuel cell 210 as anode off gas. Similarly, oxidizing gas in which the oxygen concentration has dropped is exhausted from the fuel cell 210 as cathode off gas.

A first anode channel end 212a of the anode channel 212 is connected to a second port 290b of a fuel gas bypass valve 290 through a second fuel gas piping 244. A first port 290a of the fuel gas bypass valve 290 is connected to the reformer 220, which is the supply source of fuel gas, through a first fuel gas piping 242.

The reformer 220 comprises a reforming part 222 which reforms reforming material by reacting hydrocarbon (reforming material) with steam and air (externally supplied). The reformer 220 also comprises a heating part 224 for heating the reforming part 222. The reforming material supplied to the reforming part 222 and the heating part 224 is supplied from an external reforming material supply unit to the reformer through a reforming material piping 240 by means of a reforming material supply pump 280.

The heating part 224 generates heat by catalytic combustion of reforming material and externally supplied air. The heat generated at the heating part 224 is transferred to the reforming part 222 and used in reforming reactions. High-temperature exhaust generated by the combustion of the reforming material and air is externally exhausted through a piping not illustrated.

A second anode channel end 212e of the anode channel 212 is connected to the clarifier 232 through an anode off gas piping 270. The clarifier 232 inactivates combustible constituents in the anode off gas by burning. After the inactivation of combustible constituents the clarifier 232 releases the exhaust into the atmosphere.

The anode off gas piping 270 has a branch between the second anode channel end 212e of the anode channel 212 and the clarifier 232. The branch is connected to a third port 290c of the fuel gas bypass valve 290 through the fuel gas bypass piping 246. The way to use the fuel gas bypass valve 290 and the fuel gas bypass piping 246 as a gas supply reduction unit in embodiment 1 is described below.

A first cathode channel end 214a of the cathode channel 214 is connected to the first air supply pump 284 through the oxidizing gas piping 250. The first air supply pump 284 pressurizes air as oxidizing gas and supplies it to the cathode channel 214. The cathode off gas is exhausted from a second cathode channel end 214e of the cathode channel 214 to the atmosphere through a piping not illustrated.

A first coolant gas channel end 216a of the coolant gas channel 216 is connected to a second air supply pump 282 through a cooling gas piping 260. Air supplied from the first coolant gas channel end 216a of the coolant gas channel 216 cools the fuel cell 210 during passing through the coolant gas channel 216, and is exhausted from a second coolant gas channel end 216e of the coolant gas channel 216.

The reformer 220 is controlled by the fuel cell controller 230. The fuel cell controller 230 acquires temperatures of the parts in the fuel cell system 200 obtained from temperature sensors such as a temperature sensor 286 connected to the fuel cell 210. The fuel cell controller 230 controls the parts of the fuel cell system 200 such as the pumps 280, 282, and 284, and the valve 290 based on instructions from the controller 50 (FIG. 1) and the acquired temperatures of the parts in the fuel cell system. The fuel cell controller 230 may be incorporated in the controller 50, and it may also be configured as a microcomputer separate from the controller 50.

The fuel cell controller 230 has a normal operation mode and a bypassing mode. In the normal operation mode, the first port 290a and the second port 290b of the fuel gas bypass valve 290 are opened, and the third port 290c is closed. In this mode, the first port 290a and the second port 290b of the fuel gas bypass valve 290 communicate, so fuel gas supplied from the first fuel gas piping 242 is supplied to the anode channel 212 through the second fuel gas piping 244.

In bypassing mode, the fuel cell controller 230 closes the second port 290b of the fuel gas bypass valve 290 and opens the first port 290a and the third port 290c of the fuel gas bypass valve 290. By switching the fuel gas bypass valve 290, the supply of the fuel gas to the anode channel 212 is stopped, and the fuel gas is sent to the clarifier 232.

During execution of the bypassing mode, fuel gas is not supplied to the anode channel 212. Electricity generation in the fuel cell 210 is therefore stopped. While electricity generation is stopped in the fuel cell 210, electrical power used by loads such as the high voltage auxiliary 28 (FIG. 1) and the driving inverter 26 (FIG. 1) is supplied by the secondary battery 22 (FIG. 1) connected to the wiring 40 through the converter 24 (FIG. 1).

Figure 3:
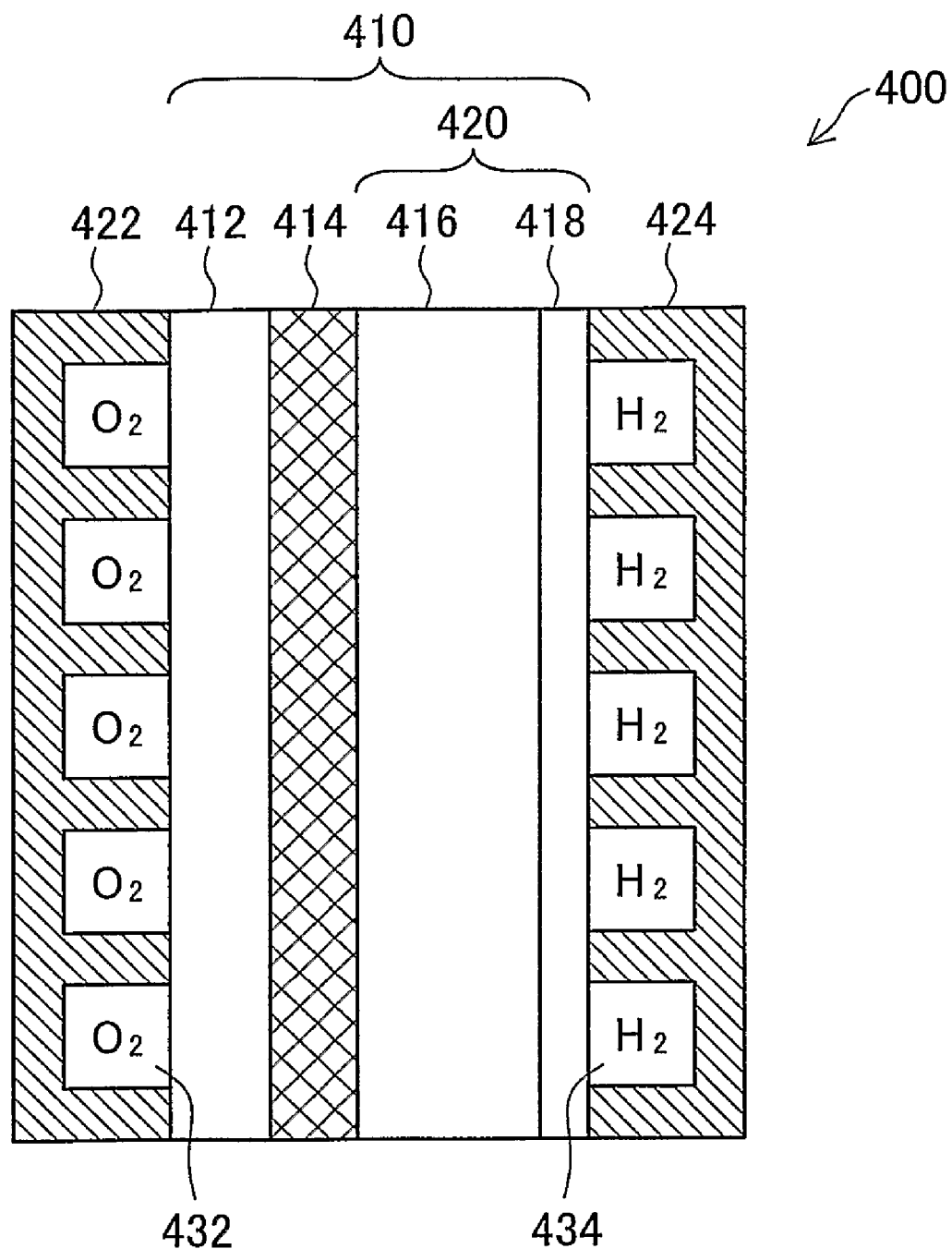
FIG. 3 is a cross-sectional illustration showing the arrangement of a single cell 400 composing the fuel cell 210.

FIG. 3 is a cross-sectional illustration showing the arrangement of a single cell 400 composing the fuel cell 210. The fuel cell 210 has a fuel cell stack in which the single cells 400 are layered. The single cell 400 is provided with an electrolyte layer 410, and two separators 422 and 424 surrounding the electrolyte layer 410. The two separators 422 and 424 are formed from a material such as press-formed carbon that is gas impermeable and conductive.

The electrolyte layer 410 has an electrolyte 414 made from an oxide solid, a cathode 412 containing platinum (Pt), and an anode 420 containing palladium (Pd). Proton conductive ceramics such as $BaCeO_3$ or $SrCeO_3$, for example, may be used as the electrolyte 414. In the present embodiment, platinum is used as the cathode, but rhodium (Rh) or another noble metal, or $LaGaMnO_3$ or other conductive ceramics may also be used as the cathode.

The anode 420 has a hydrogen permeable metal layer 416 and a hydrogen molecule dissociation layer 418 for dissociating hydrogen molecules. A thin palladium membrane, for example, may be used as the hydrogen molecule dissociation layer 418. An elemental metal such as palladium or vanadium (V), or an alloy containing palladium or vanadium, for example, may be used as the material in the hydrogen permeable metal layer 416.

A concave portion is provided opposing the electrolyte layers 410 of the first separator 422 and the second separator 424. The concave portion provided at the first separator 422 forms an oxidizing gas channel 432 (corresponding to the cathode channel 214 in FIG. 2) between the first separator 422 and the cathode 412. Also, the concave portion provided at the second separator 424 forms a fuel gas channel 434 (corresponding to the anode channel 212 in FIG. 2) between the second separator 424 and the anode 420.

Hydrogen molecules in the fuel gas introduced to the fuel gas channel 434 is dissociated at the hydrogen molecule dissociation layer 418, becoming protons. The dissociated protons arrive at the electrolyte 414 through the hydrogen permeable metal layer 416. The electrolyte 414 supplies protons to the cathode 412. In the cathode 412, the protons supplied from the anode 420 and the oxygen in the oxidizing gas introduced to the oxidizing gas channel 432 react and generate water. This fuel cell reaction accompanies the movement of protons through the electrolyte 414 and proceeds when electrodes move from the anode 420 to the cathode 412 through external conductor.

Figure 4:
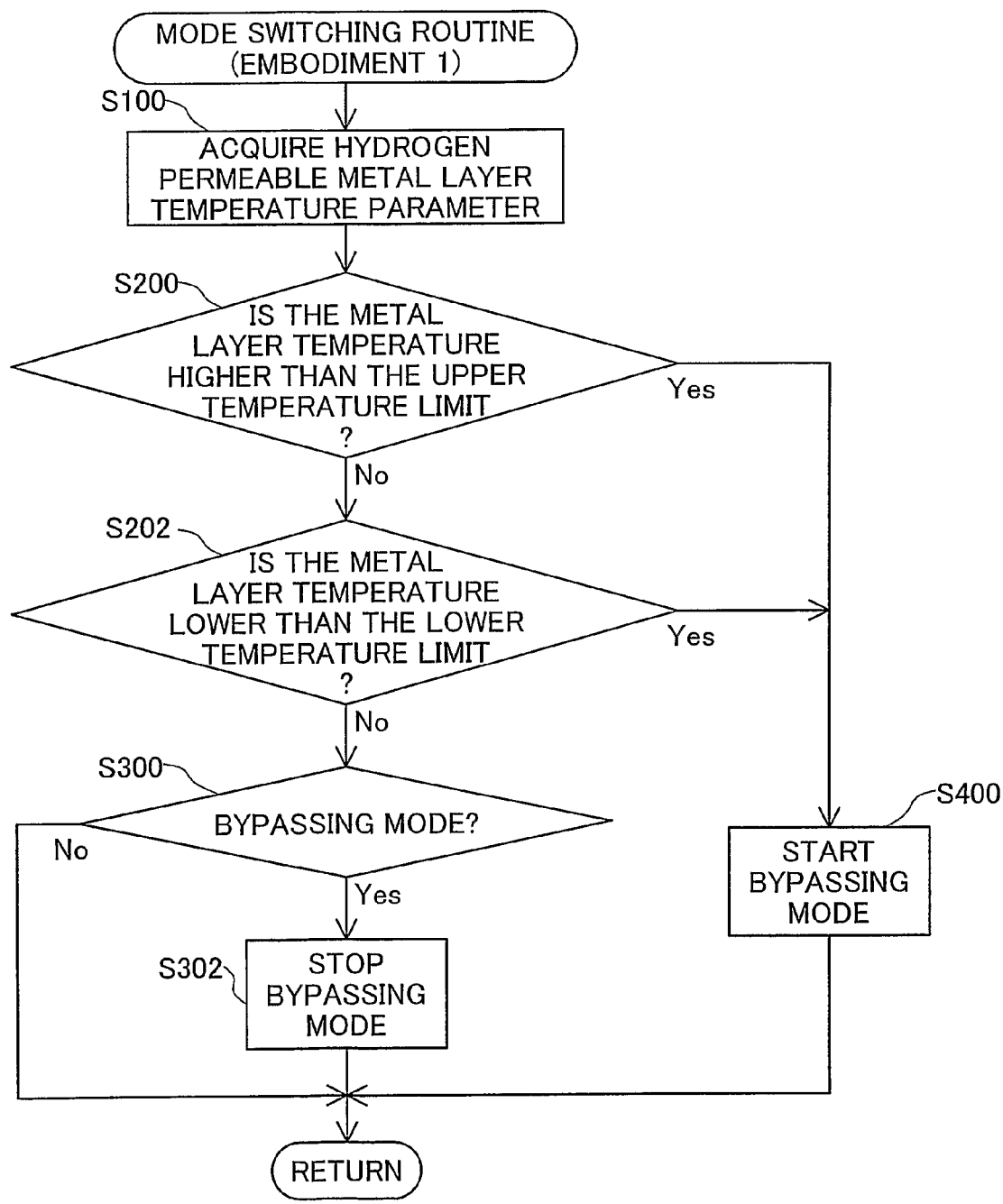
FIG. 4 is a flowchart showing the operation mode switching routine in embodiment 1.

FIG. 4 is a flowchart showing the operation mode switching routine in embodiment 1. This routine is executed at a specified time interval after the fuel cell system 200 (FIG. 2) starts up.

In step S100, the fuel cell controller 230 (FIG. 2) acquires a parameter representing the temperature (hereinafter, referred to as the "temperature parameter") of the hydrogen permeable metal layer 416 (FIG. 3) based on the output of the temperature sensor 286 (FIG. 2) provided at the fuel cell 210 (FIG. 2). The temperature parameter can be estimated, for example, by carrying out an experimentally found appropriate conversion on the output of the temperature sensor 286.

In step S200, the fuel cell controller 230 determines whether or not the temperature of the hydrogen permeable metal layer 416 (hereinafter, referred to as the "hydrogen permeable metal layer temperature") represented by the temperature parameter is higher than a predetermined upper temperature limit. If the hydrogen permeable metal layer temperature is higher than the predetermined upper temperature limit, the process moves to step S400, and execution of bypassing mode begins. If the hydrogen permeable metal layer temperature is lower than the predetermined upper temperature limit, the process advances to step S202.

The upper temperature limit is set based on the temperature at which metal diffusion in the hydrogen permeable metal layer 416 can be prevented. If the hydrogen permeable metal layer 416 is maintained in a high temperature state, metal diffusion occurs between it and the hydrogen molecule dissociation layer 418 (FIG. 3). This characteristic can be taken into consideration to set the upper temperature limit. The upper temperature limit is set to a value, for example, slightly lower than the upper limit at which excessive metal diffusion can be avoided in the hydrogen permeable metal layer 416. For example, if palladium is used in the hydrogen molecule dissociation layer 418 and vanadium is used in the hydrogen permeable metal layer 416, the upper temperature limit can be set to an arbitrary temperature below 700° C.

In step S202, the fuel cell controller 230 determines whether the hydrogen permeable metal layer temperature is below a predetermined lower temperature limit. If the hydrogen permeable metal layer temperature is lower than the predetermined temperature, the process moves to step S400, and execution of the bypassing mode begins. If the hydrogen permeable metal layer is above the predetermined lower temperature limit, the process advances to step S300.

The lower temperature limit is set based on the temperature at which hydrogen embrittlement of the hydrogen permeable metal layer 416 can be prevented. If the hydrogen permeable metal layer 416 is exposed to hydrogen at a low temperature, hydrogen is absorbed and the absorption causes hydrogen embrittlement. This characteristic can be taken into consideration to set the lower temperature limit. The lower temperature limit is set to a value, for example, slightly higher than the lower limit at which excessive hydrogen embrittlement can be avoided even if the hydrogen permeable metal layer 416 is exposed to hydrogen. For example, if vanadium is used in the hydrogen permeable metal layer 416, the lower temperature limit can be set to an arbitrary temperature above 200° C.

In step S300, the fuel cell controller 230 determines whether the operation mode is bypassing mode. If it is, the operation mode is switched from bypassing mode to normal operation mode in step S302. If the operation mode is not bypassing mode, the routine ends.

In embodiment 1, if the hydrogen permeable metal layer temperature of the fuel cell 210 (FIG. 2) deviates outside a predetermined temperature range, the bypassing mode is executed. The fuel gas is thereby diverted from the anode channel 212 (FIG. 2) to the fuel gas bypass piping 246 (FIG. 2). By diverting the fuel gas, the volume of reformed gas generated in the reformer 220 can be maintained above a predetermined amount and maintaining operation of the reformer 220, while supply of the fuel gas to the fuel cell 210 is stopped.

In this manner, if the hydrogen permeable metal layer temperature in the fuel cell system 200 (FIG. 2) in embodiment 1 drops below the predetermined lower temperature limit, gas containing hydrogen is not supplied to the anode channel 212. Hydrogen embrittlement of the hydrogen permeable metal layer 416 (FIG. 3) is thereby suppressed, so that degradation of the hydrogen permeable metal layer 416 can be prevented.

Also, fuel gas generated in the reformer 220 (FIG. 2) generally becomes hotter than the operation temperature of the fuel cell 210 due to heat from the reaction to reform the reforming material and that from the heating part 224 (FIG. 2). If the hydrogen permeable metal layer temperature increases above the upper temperature limit in the fuel cell system 200 in embodiment 1, temperature increases due to high temperature fuel gas are suppressed. Metal diffusion in the hydrogen permeable metal layer 416 is thereby suppressed, so that degradation of the hydrogen permeable metal layer 416 can be prevented.

In embodiment 1, the fuel cell system is configured to stop supply of fuel gas into the anode channel 212 by changing fuel gas path using the fuel gas bypass valve 290 (FIG. 2). But in general, the fuel cell system may be configured to decrease flow rate of fuel gas supplied into the anode channel 212. The fuel gas flow rate supplied into the anode channel 212 can be adjusted, for example, by providing an adjustment valve instead of the fuel gas bypass valve 290 on the fuel gas path.

B. Embodiment 2

Figure 5:
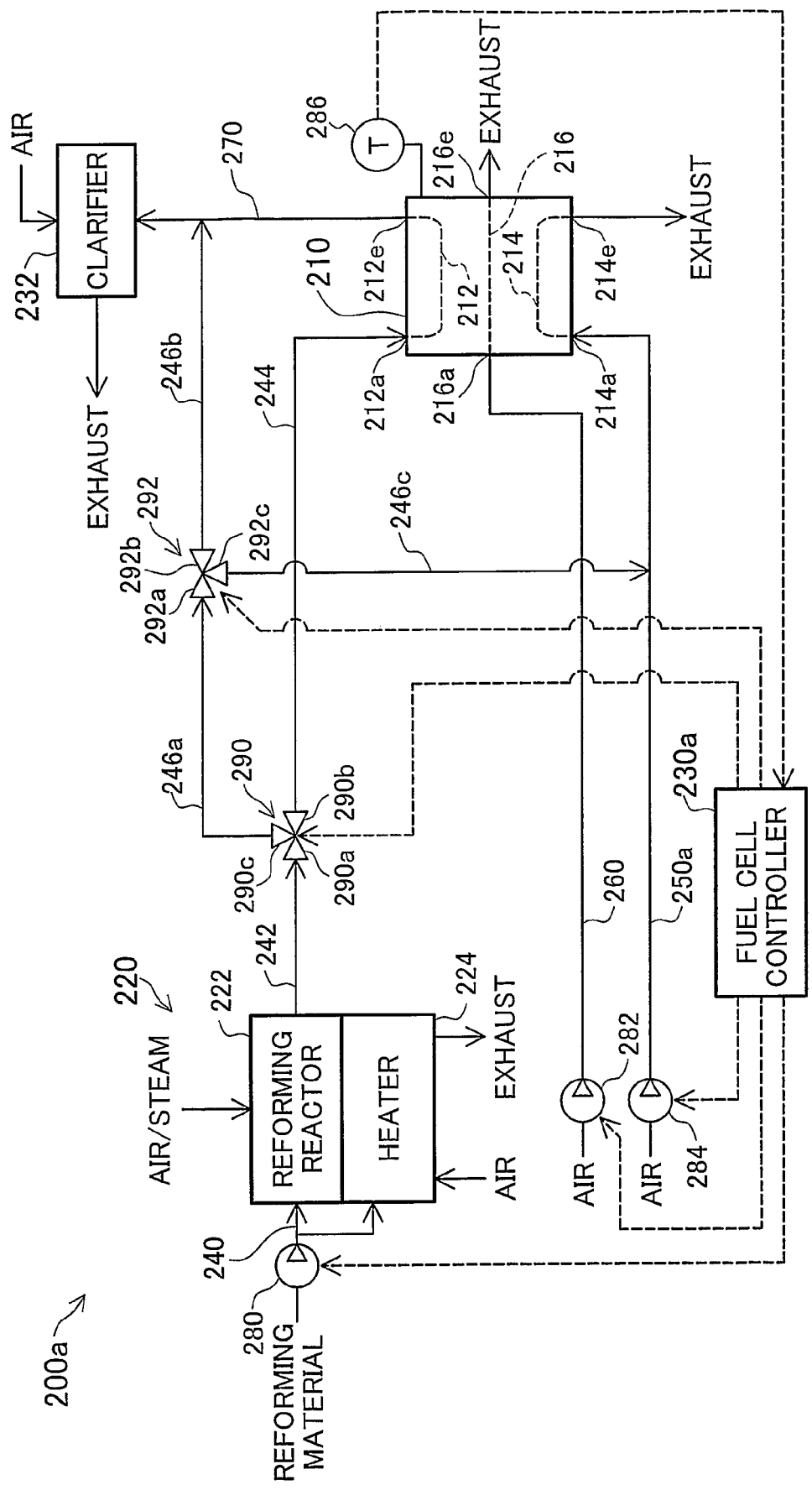
FIG. 5 is a schematic illustration showing the arrangement of a fuel cell system 200a in embodiment 2.

FIG. 5 is a schematic illustration showing the arrangement of a fuel cell system 200a in embodiment 2. The fuel cell system 200 (FIG. 2) differs from that in embodiment 1 by having a path for supplying diverted fuel gas to the cathode channel 214. In concrete terms, a third port 290c of the fuel gas bypass valve 290 provided at the fuel gas channel is connected to a first port 292a of the combustible gas supply valve 292 through a first fuel gas bypass piping 246a. A second port 292b of the combustible gas supply valve 292 is connected to a branch provided at the anode off gas piping 270 through the second fuel gas bypass piping 246b. An oxidizing gas piping 250a has a branch between the first air supply pump 284 and the first cathode channel end 214a. This branch is connected to the third port 292c of the combustible gas supply valve 292 through the combustible gas supply piping 246c. Other arrangements are virtually identical to those in embodiment 1.

A fuel cell controller 230a has a normal operation mode and a bypassing mode as in embodiment 1. In normal operation mode, the fuel gas bypass valve 290 is controlled as in embodiment 1. In bypassing mode, however, the second port 290b of the fuel gas bypass valve 290 is closed, and the first port 290a and third port 290c are opened. Also, the first port 292a and second port 292b of the combustible gas supply valve 292 are opened, and the third port 292c is closed. The fuel gas supplied through the first fuel gas piping 242 is therefore sent to the clarifier 232 through the first fuel gas bypass piping 246a, the combustible gas supply valve 292, and the second fuel gas bypass piping 246b.

Further the fuel cell controller 230a has a heating mode for heating the hydrogen permeable metal layer 416 (FIG. 3). In heating mode, the second port 290b of the fuel gas bypass valve 290 is closed, and the first port 290a and third port 290c are opened. Also, the second port 292b of the combustible gas supply valve 292 is closed, and the first port 292a and third port 292c are opened. The fuel gas supplied through the first fuel gas piping 242 is therefore sent to the cathode channel 214 through the first fuel gas bypass piping 246a, the combustible gas supply valve 292, and the combustible gas supply piping 246c.

The fuel gas supplied through the combustible gas supply piping 246c is mixed with air supplied through the oxidizing gas piping 250a, becomes combustible mixed gas. The mixed gas is supplied to the cathode channel 214. The mixed gas in the cathode channel 214 causes a combustion reaction due to the action of the cathode, which contacts the cathode channel 214, having activity as an oxidation catalyst. The hydrogen permeable metal layer 416 is heated by heat produced by the combustion reaction in the cathode channel 214.

Figure 6:
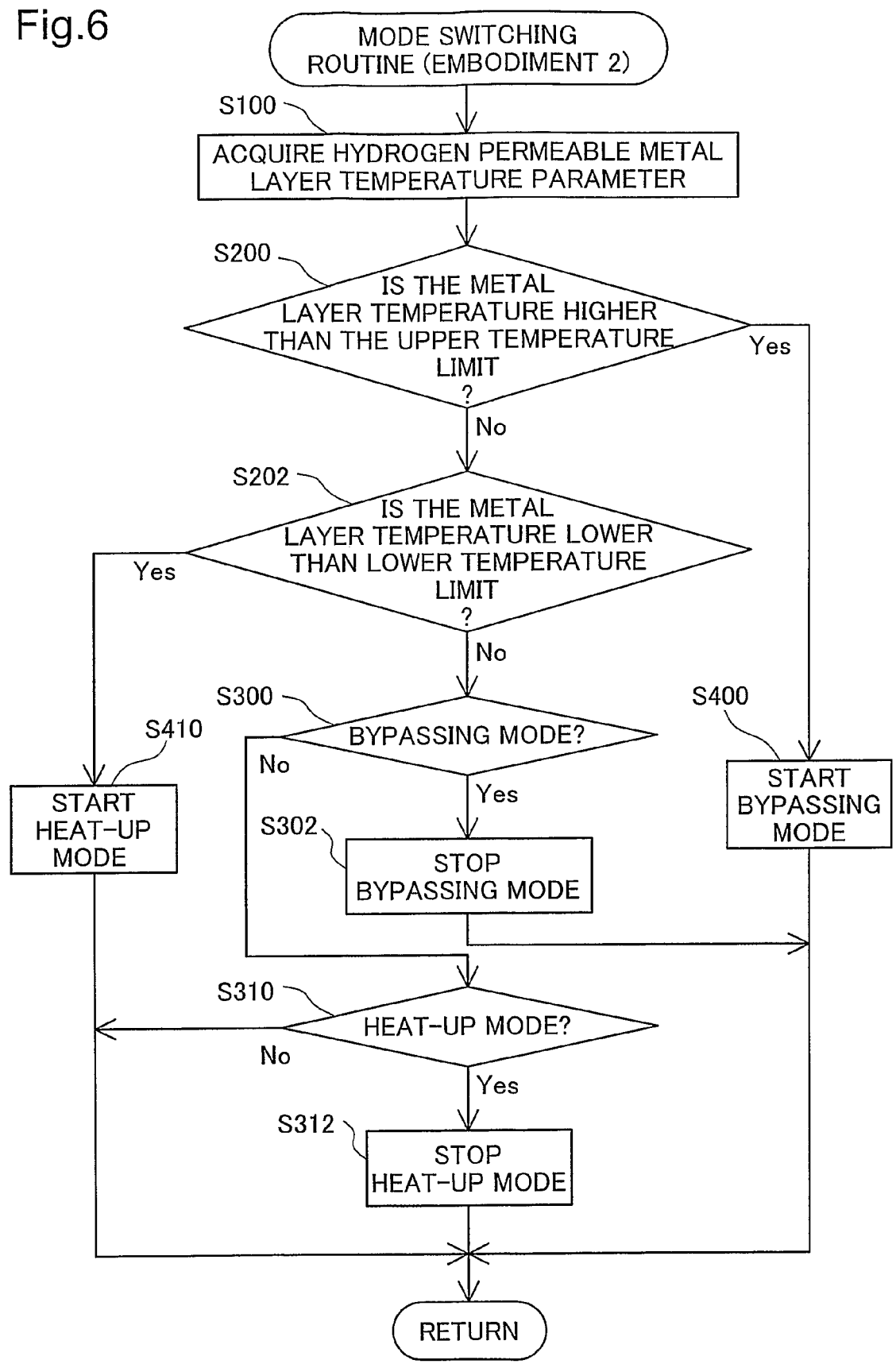
FIG. 6 is a flowchart showing the operation mode switching routine in embodiment 2.

FIG. 6 is a flowchart showing the operation mode switching routine in embodiment 2. In this flowchart, steps S310, S312, and S410 relating to the heating mode are added to those in the flowchart for embodiment 1 shown in FIG. 4.

In embodiment 2, if it is determined in step S202 that the hydrogen permeable metal layer temperature is below the lower temperature limit, execution of the heating mode begins in step S410. After execution of heating mode begins, the routine ends.

Also, in embodiment 2, if it is determined in step S300 that the operation mode is not bypassing mode, the process moves to step S310. In step S310, it is determined whether the operation mode is heating mode or not. If it is, the operation mode is switched from heating mode to normal operation mode in step S312. If the operation mode is not heating mode, the routine ends.

In this manner, if the hydrogen permeable metal layer temperature is below the lower temperature limit in embodiment 2, the hydrogen permeable metal layer 416 (FIG. 3) is heated by the combustion of the mixed gas in the cathode channel 214 (FIG. 5). Because of this, embodiment 2 is preferable to embodiment 1 in that in the former, a rise in the temperature of the hydrogen permeable metal layer 416 is facilitated when the hydrogen permeable metal layer temperature is below the predetermined lower temperature limit, making it easy to restore the hydrogen permeable metal layer temperature. However, embodiment 1 is preferable to embodiment 2 in that the structure of the fuel cell system is simpler.

In embodiment 2, mixed gas is supplied to the cathode channel 214 in heating mode, and the hydrogen permeable metal layer 416 is heated by the combustive reaction in the cathode channel 214, but in general, the mixed gas can be supplied to a channel in which an oxidizing catalyst is provided in the fuel cell 210 (FIG. 5). For example, if an oxidizing catalyst is provided in the coolant gas channel 216 (FIG. 5), mixed gas may be introduced to the coolant gas channel 216 for heating the hydrogen permeable metal layer. Also, the mixed gas may be supplied to the anode channel 212. If the mixed gas is introduced to the anode channel 212, it is preferable if the ratio of the oxidizing component to the hydrogen in the mixed gas is larger than the stoichiometric ratio if the mixed gas is supplied to the anode channel 212.

C. Embodiment 3

Figure 7:
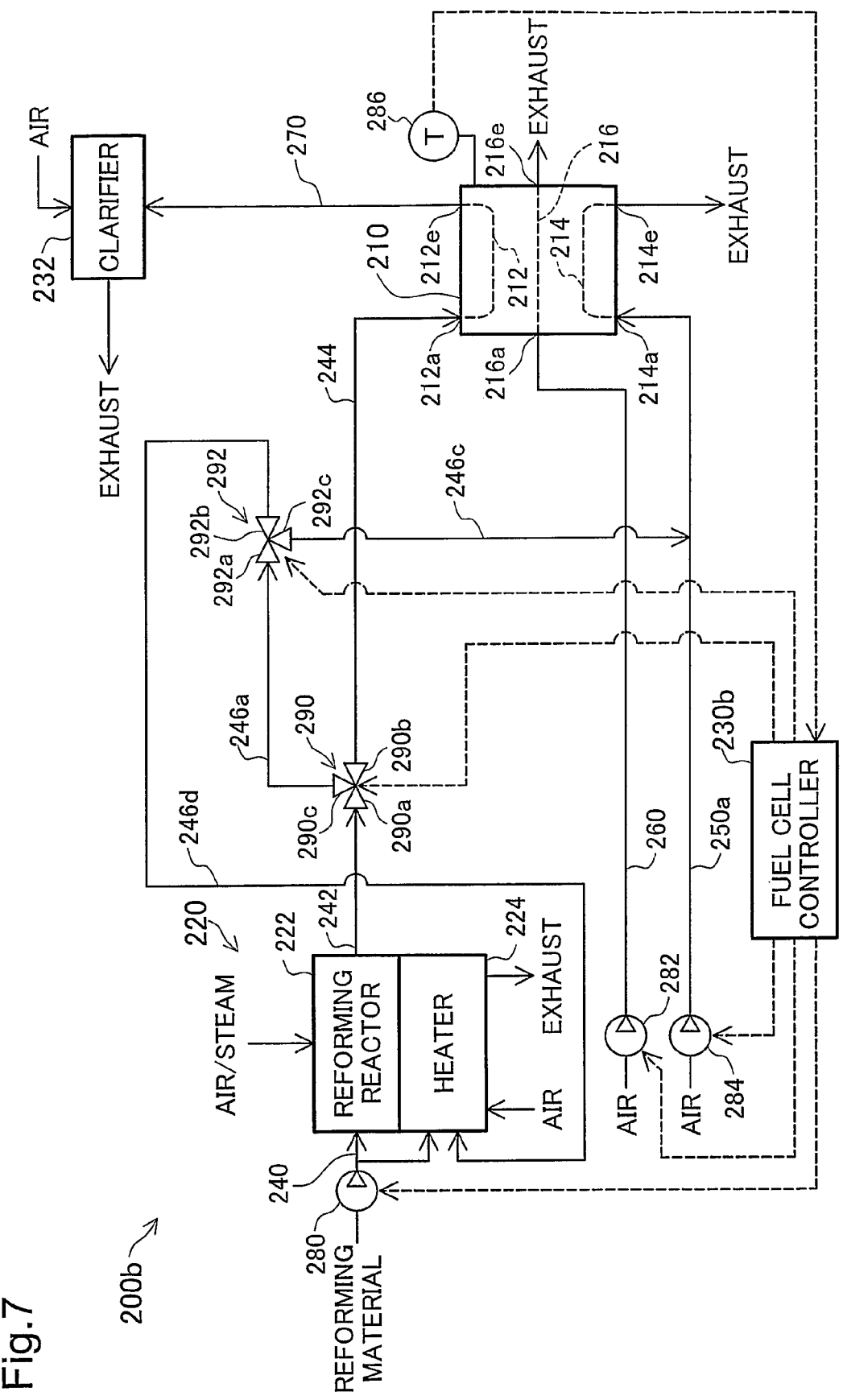
FIG. 7 is a schematic illustration showing the arrangement of the fuel cell system 200b in embodiment 3.

FIG. 7 is a schematic illustration showing the arrangement of the fuel cell system 200b in embodiment 3. The fuel cell system 200b differs from the fuel cell system 200a (FIG. 5) in embodiment 2 in that the diverted fuel gas is supplied to the heating part 224 of the reformer 220 instead of the clarifier 232. In concrete terms, the second port 292b of the combustible gas supply valve 292 is connected to the heating part 224 through the second combustible gas supply piping 246d. Other arrangements are virtually identical to those in embodiment 2.

In embodiment 3, when the operation mode of the fuel cell system 200b is bypassing mode, the diverted fuel gas is supplied to the heating part 224 through the second combustible gas supply piping 246d. Heat is generated in a combustive reaction between the supplied fuel gas and externally supplied air.

In this manner, when the operation mode is bypassing mode in embodiment 3, the fuel gas combusts at the heating part 224, not at the clarifier 232. Embodiment 3 is therefore preferable to embodiment 2 in that the amount of reforming material used in heating the reforming part 222 is decreased, improving the fuel efficiency of the fuel cell system 200. However, embodiment 2 is preferable to embodiment 3 in that the arrangement of the heating part 224 is simpler.

In that it is easier to restore the hydrogen permeable metal layer temperature when the hydrogen permeable metal layer temperature is lower than the predetermined lower temperature limit, as with embodiment 2, embodiment 3 is preferable to embodiment 1. However, embodiment 1 is preferable to embodiment 3 in that the arrangement of the fuel cell system is simpler.

D. Embodiment 4

Figure 8:
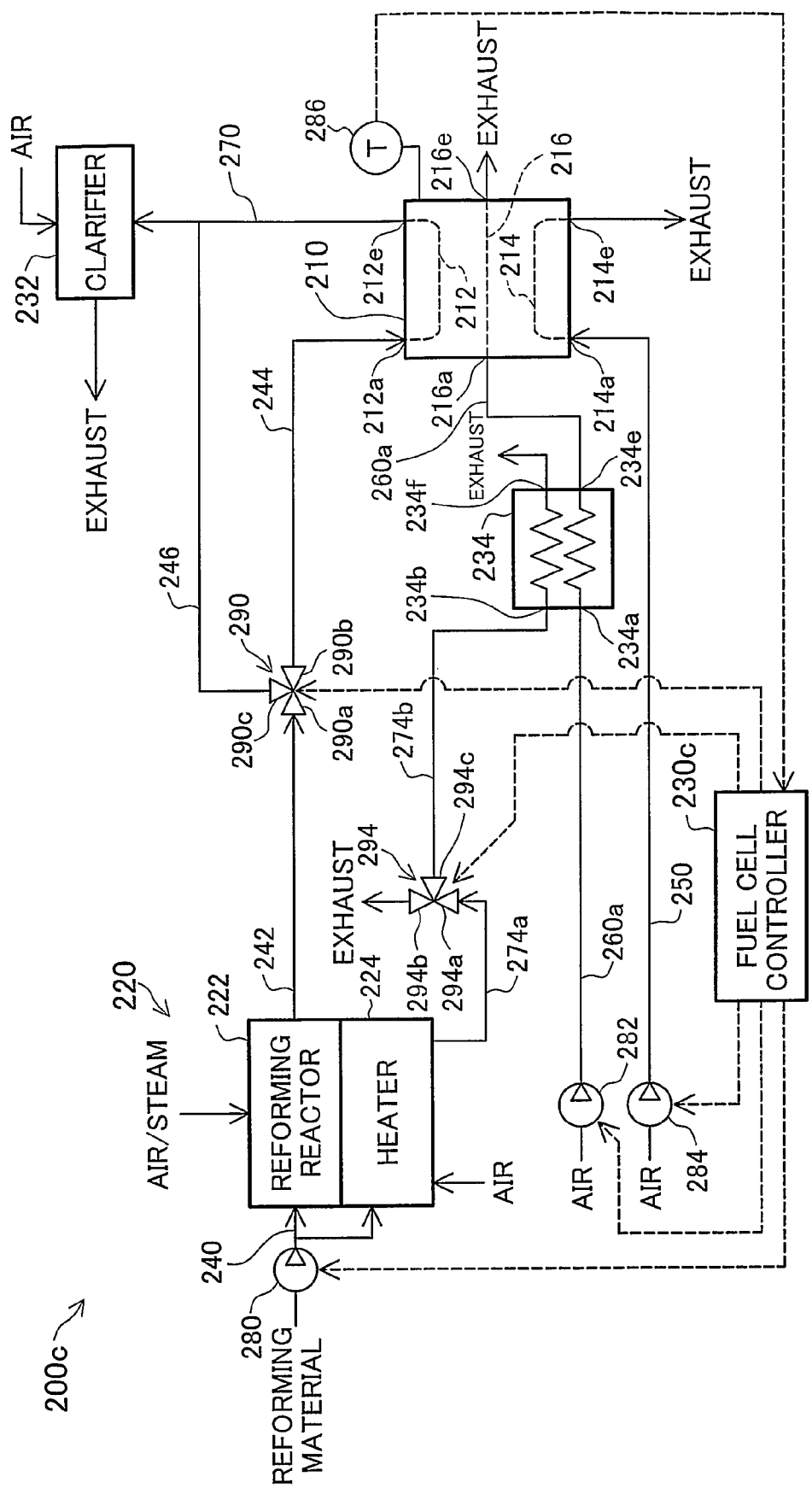
FIG. 8 is a schematic illustration showing the arrangement of the fuel cell system 200c in embodiment 4.

FIG. 8 is a schematic illustration showing the arrangement of the fuel cell system 200c in embodiment 4. The fuel cell system 200c differs from the fuel cell system 200 (FIG. 2) in embodiment 1 in that by having a heat exchanger 234 and a piping for supplying exhaust from the heating part 224 to the heat exchanger 234 to heat the cooling gas. In concrete terms, the second air supply pump 282 is connected to a first gas flow inlet 234a of the heat exchanger 234 through a first cooling gas piping 260a. The first gas flow inlet 234a is connected to a first gas flow outlet 234e through a channel inside the heat exchanger 234. The first gas flow outlet 234e is connected to a first coolant gas channel end 216a provided in the fuel cell 210 through a second cooling gas piping 260b. The second gas flow inlet 234b of the heat exchanger 234 is connected to a third port 294c of the reformer exhaust path switching valve 294 through a second reformer exhaust piping 247b. The first port 294a of the reformer exhaust path switching valve 294 is connected to the heating part 224 of the reformer 220. Other arrangements are virtually identical to those in embodiment 1.

The fuel cell controller 230c of embodiment 3 has a normal operation mode and a bypassing mode, similar to the fuel cell controller 230a of embodiment 2. The fuel gas bypass valve 290 is controlled in embodiment 4 similarly in these modes as in embodiment 2.

In bypassing mode, the fuel cell controller 230c opens the first port 294a and second port 294b of the reformer exhaust path switching valve 294 and closes the third port 294c. Because of this, the exhaust from the heating part 224 is externally exhausted from the heating part 224 through the reformer exhaust piping 274a and the reformer exhaust path switching valve 294 in bypassing mode.

In heating mode, the fuel cell controller 230c closes the second port 294b of the reformer exhaust path switching valve 294 and opens the first port 294a and third port 294c. Because of this, the exhaust from the heating part 224 is supplied from the heating part 224 to the heat exchanger 234 through the first reformer exhaust piping 274a, the reformer exhaust path switching valve 294, and the second reformer exhaust piping 274b.

The cooling gas flowing from the first gas flow inlet 234a to the first gas flow outlet 234e is heated while exhaust from the heating part 224 supplied to the heat exchanger 234 passes from the second gas flow inlet 234b of the heat exchanger 234 to the second gas flow outlet 234f. Then, after heating the cooling gas, the exhaust from the heating part 224 is externally exhausted from the second gas flow outlet 234f.

In this manner, the cooling gas is heated by the heat exchanger 234 in embodiment 4. Then, the heated cooling gas is supplied to the coolant gas channel 216, thereby heating the hydrogen permeable metal layer 416 (FIG. 3). Because of that, embodiment 4 is preferable to embodiment 1 similarly to embodiment 2 and embodiment 3 in that a rise in the temperature of the hydrogen permeable metal layer 416 is facilitated when the hydrogen permeable metal layer temperature is below the predetermined lower temperature limit, making it easy to restore the hydrogen permeable metal layer temperature.

Also, embodiment 4 is preferable to embodiment 2 and embodiment 3 in that the hydrogen permeable metal layer 416 is heated by supplying high temperature gas, so the temperature of the hydrogen permeable metal layer 416 is uniform. However, embodiment 1 to embodiment 3 are preferable to embodiment 4 in that the arrangement of the fuel cell system is simpler.

In embodiment 4, the hydrogen permeable metal layer 416 is heated by heated cooling gas, but in general, high temperature gas may be supplied to a channel provided at the fuel cell 210. For example, the hydrogen permeable metal layer 416 may be heated by heating oxidizing gas introduced to the cathode channel 214. Also, high temperature gas produced by a combustor may be introduced to a channel provided at the fuel cell 210.

Also, in embodiment 4, exhaust gas from the heating part 224 is used as the heat source for heating the cooling gas, but some other heat source may be used as well. For example, a catalyst may be provided in a channel of the heat exchanger 234, and combustible mixed gas supplied to the heat exchanger 234 to cause a combustion reaction, and the heat produced may be used as a source for heating the cooling gas.

E. Embodiment 5

Figure 9:
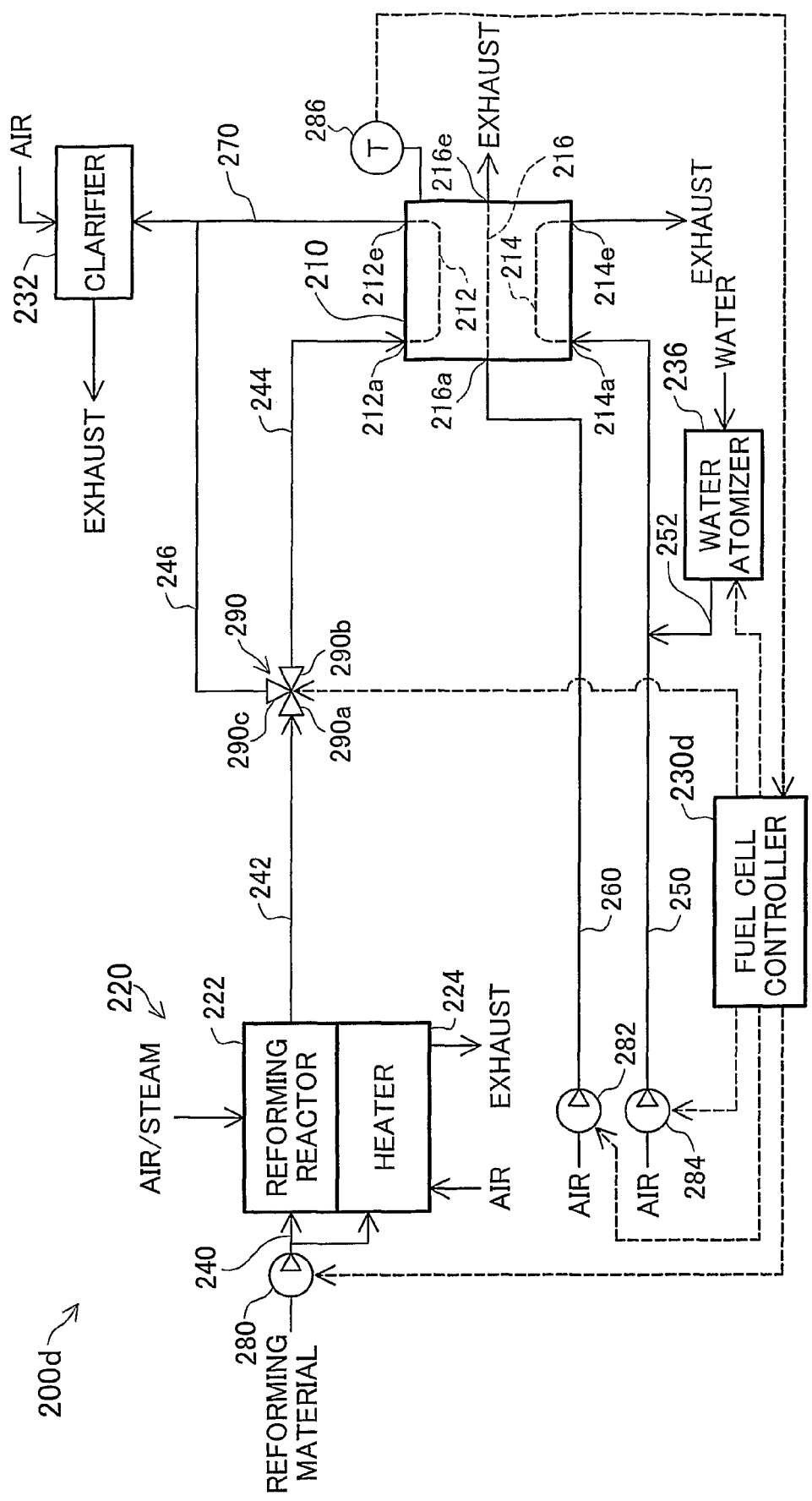
FIG. 9 is a schematic illustration showing the arrangement of the fuel cell system 200d in embodiment 5.

FIG. 9 is a schematic illustration showing the arrangement of the fuel cell system 200d in embodiment 5. The fuel cell system 200d differs from the fuel cell system 200 (FIG. 2) in embodiment 1 in that the former is equipped with a water atomizer 236 for cooling the oxidizing gas. In concrete terms, an oxidizing gas piping 250b has a branch between the first air supply pump 284 and the first cathode channel end 214a. This branch is connected to the water atomizer 236 through a water supply piping 252. Other arrangements are virtually identical to those in embodiment 1.

The fuel cell controller 230d in embodiment 5 has a normal operation mode and a bypassing mode similar to the fuel cell controller 230 of embodiment 1. In these modes, the fuel gas bypass valve 290 is controlled similarly to in embodiment 1.

The fuel cell controller 230d operates the water atomizer 236 when the hydrogen permeable metal layer temperature is higher than the predetermined upper temperature limit described above. The water atomizer 236 atomizes externally supplied water, supplying it to the oxidizing gas piping 250b through the water supply piping 252. The oxidizing gas is cooled by the vaporization heat of the water in the form of mist. The hydrogen permeable metal layer 416 (FIG. 3) is cooled by supplying oxidizing gas thus cooled.

In this manner, the hydrogen permeable metal layer 416 (FIG. 3) can be cooled when the hydrogen permeable metal layer temperature is higher than the predetermined upper temperature limit. Because of this, embodiment 5 is preferable to embodiment 1 to embodiment 4 in that a decrease in the temperature of the hydrogen permeable metal layer 416 is facilitated in the former when the hydrogen permeable metal layer temperature is higher than the predetermined higher temperature limit, making it easy to restore the hydrogen permeable metal layer temperature. However, embodiments 2 to 4 are preferable to embodiment 5 in that it is easier to restore the hydrogen permeable metal layer temperature when it is lower than the predetermined lower temperature limit. Also, embodiment 1 is preferable to embodiment 5 in that the arrangement of the fuel cell system is simpler.

In embodiment 5, oxidizing gas is supplied by the vaporization heat of the water supplied by the water atomizer 236, but in general, other methods are fine as long as the gas supplied to the fuel cell 210 can be cooled. For example, the gas supplied to the fuel cell 210 may be cooled by a heat exchanger in which cooling media is introduced, thereby cooling the hydrogen permeable metal layer 416.

F. Embodiment 6

Figure 10:
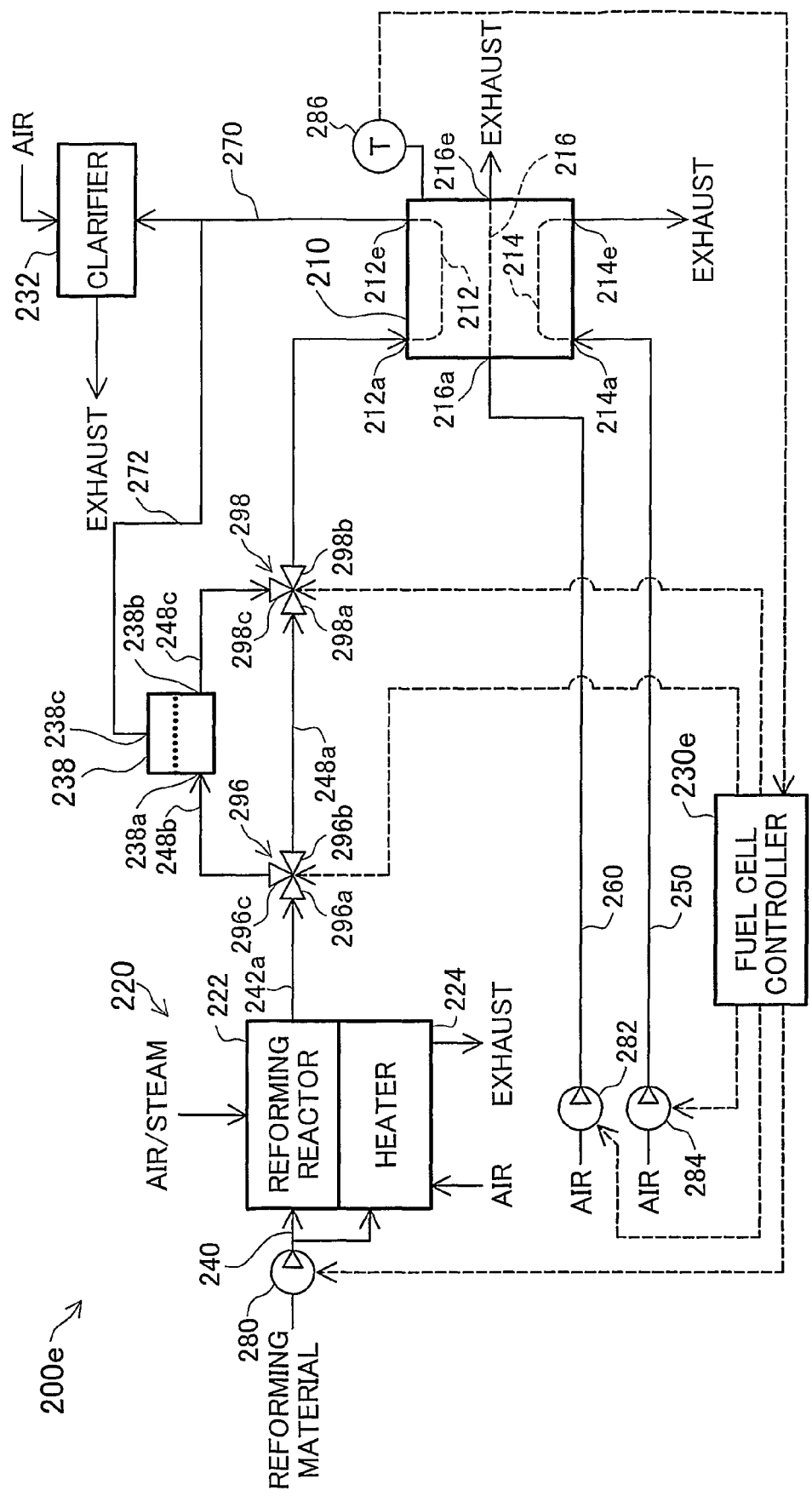
FIG. 10 is a schematic illustration showing the arrangement of a fuel cell system 200e in embodiment 6.

FIG. 10 is a schematic illustration showing the arrangement of a fuel cell system 200e in embodiment 6. The fuel cell system 200e differs from the fuel cell system 200 (FIG. 2) in embodiment 1 in that the former is equipped with a hydrogen separator 238 in place of the fuel gas bypass valve 290.

In concrete terms, a first fuel gas piping 242a is connected to both the reforming part 222 and a first port 296a of the first hydrogen separator bypass valve 296. Also, a second fuel gas piping 244a is connected to a second port 298b of the second hydrogen separator bypass valve 298. The second port 296b of the first hydrogen separator bypass valve 296 and the first port 298a of the second hydrogen separator bypass valve 298 are connected by a hydrogen separator bypass piping 248a.

The gas flow inlet 238a of the hydrogen separator 238 is connected to a third port 296c of the first hydrogen separator bypass valve 296 through a first hydrogen separator connection piping 248b. The gas flow outlet 238b of the hydrogen separator 238 is connected to a third port 298c of the second hydrogen separator bypass valve 298 through a second hydrogen separator connection piping 248c. Also, a hydrogen flow outlet 238c of the hydrogen separator 238 is connected to a branch provided at the anode off gas piping 270 through a hydrogen exhaust piping 272.

The gas flow outlet 238a and the gas flow outlet 238b of the hydrogen separator 238 mutually communicate through a channel provided at the hydrogen separator 238. When fuel gas passes through this channel, hydrogen in the fuel gas reaches a diaphragm having hydrogen permeable metal provided in the channel wall and penetrates the hydrogen flow outlet 238c. This penetration by the hydrogen causes the hydrogen concentration in the fuel gas to drop while the hydrogen is passing through the hydrogen separator 238.

In embodiment 6, a hydrogen concentration reduction part for decreasing the hydrogen concentration in fuel gas comprises of hydrogen separator bypass valves 296 and 298, hydrogen separator connection pipings 248b and 248c, the hydrogen separator 238, and a hydrogen exhaust piping 272. Other arrangements are virtually identical to those in embodiment 1.

A fuel cell controller 230e of embodiment 6 has a normal operation mode and a hydrogen separation mode. In normal operation mode, the fuel cell controller 230e opens a first port 296a and a second port 296b of a first hydrogen separator bypass valve 296, and closes a third port 296c. Also, the fuel cell controller 230e opens a first port 298a and a second port 298b of the hydrogen separator bypass valve 298 and closes a third port 298c. Fuel gas supplied from the reforming part 222 passes through the first fuel gas piping 242a, the hydrogen separator bypass piping 248a, and the second fuel gas piping 244a, and is supplied unchanged to the anode channel 212.

In hydrogen separation mode, the fuel cell controller 230e closes the second port 296b of the first hydrogen separator bypass valve 296 and opens the first port 296a and third port 296c. Also, the fuel cell controller 230e closes the second port 298b of the second hydrogen separator bypass valve 298 and opens the first port 298a and the third port 298c. Fuel gas supplied from the reforming part 222 passes through the first fuel gas piping 242a, the first hydrogen separator connection piping 248b, and is supplied to the hydrogen separator 238. Then, the fuel gas whose hydrogen concentration has been decreased by the hydrogen separator 238 passes through the second hydrogen separator connection piping 248c and the second fuel gas piping 244a, and is supplied to the anode channel 212.

In embodiment 6, hydrogen separation mode is executed if the hydrogen permeable metal layer temperature deviates from the predetermined temperature range. Execution of the hydrogen separation mode decreases hydrogen concentration in fuel gas which is supplied to the anode channel 212. Also, by reducing the hydrogen concentration of the fuel gas, it is possible to maintain at least the predetermined production volume of reformed gas from the reformer 220 to continue operation of the reformer 220 while decreasing the supply of hydrogen to the anode channel 212.

In the fuel cell system 200e of embodiment 6, if the hydrogen permeable metal layer temperature drops below a predetermined lower temperature limit, the hydrogen concentration in the fuel cell supplied to the anode channel 212 is decreased. Because of this, it is possible to suppress hydrogen embrittlement of the hydrogen permeable metal layer 416 (FIG. 3), and to prevent degradation of the hydrogen permeable metal layer 416.

Also, if fuel gas with a low hydrogen concentration is supplied to the anode channel 212, the reaction quantity in fuel cell reactions decreases. Accordingly, in the fuel cell system 200e in embodiment 6, if the hydrogen permeable metal layer temperature is above a predetermined upper temperature limit, the fuel cell reaction is suppressed by reducing the hydrogen concentration in the fuel gas supplied to the anode channel 212. Thus, temperature increases due to fuel cell reactions are suppressed. As a result, metal diffusion in the hydrogen permeable metal layer 416 can be suppressed, and degradation of the hydrogen permeable metal layer 416 can be prevented.

In this manner, it is possible to prevent degradation of the hydrogen permeable metal layer 416 in embodiment 6 as well when the hydrogen permeable metal layer temperature deviates from a predetermined range, similar to embodiment 1. Embodiment 6 is preferable to embodiment 1 in that it is possible to suppress decreases in the hydrogen permeable metal layer temperature due to fuel gas heat when the hydrogen permeable metal layer temperature falls below a predetermined lower temperature limit.

In embodiment 6, hydrogen exhausted from the hydrogen separator 238 passes through the clarifier 232 and is exhausted, but if the hydrogen permeable metal layer temperature falls below the predetermined lower temperature limit, the hydrogen may be supplied to the cathode channel 214 as in embodiment 2 and embodiment 3. In such a case, this is preferable in that combustion of the hydrogen supplied from the hydrogen separator 238 makes restoration of the hydrogen permeable metal layer temperature easy.

Also, in embodiment 6, the hydrogen concentration in the fuel gas is decreased, thereby suppressing degradation of the hydrogen permeable metal layer 416, but in general, it is sufficient if the partial pressure of the hydrogen can be decreased in the anode channel 212. For example, even if a lower hydrogen concentration gas supply part is provided to supply gas (including gas not containing hydrogen) whose hydrogen concentration is lower than fuel gas to the anode channel 212, the partial pressure of the hydrogen can be decreased, so it is possible to prevent degradation of the hydrogen permeable metal layer 416.

G. Embodiment 7

Figure 11:
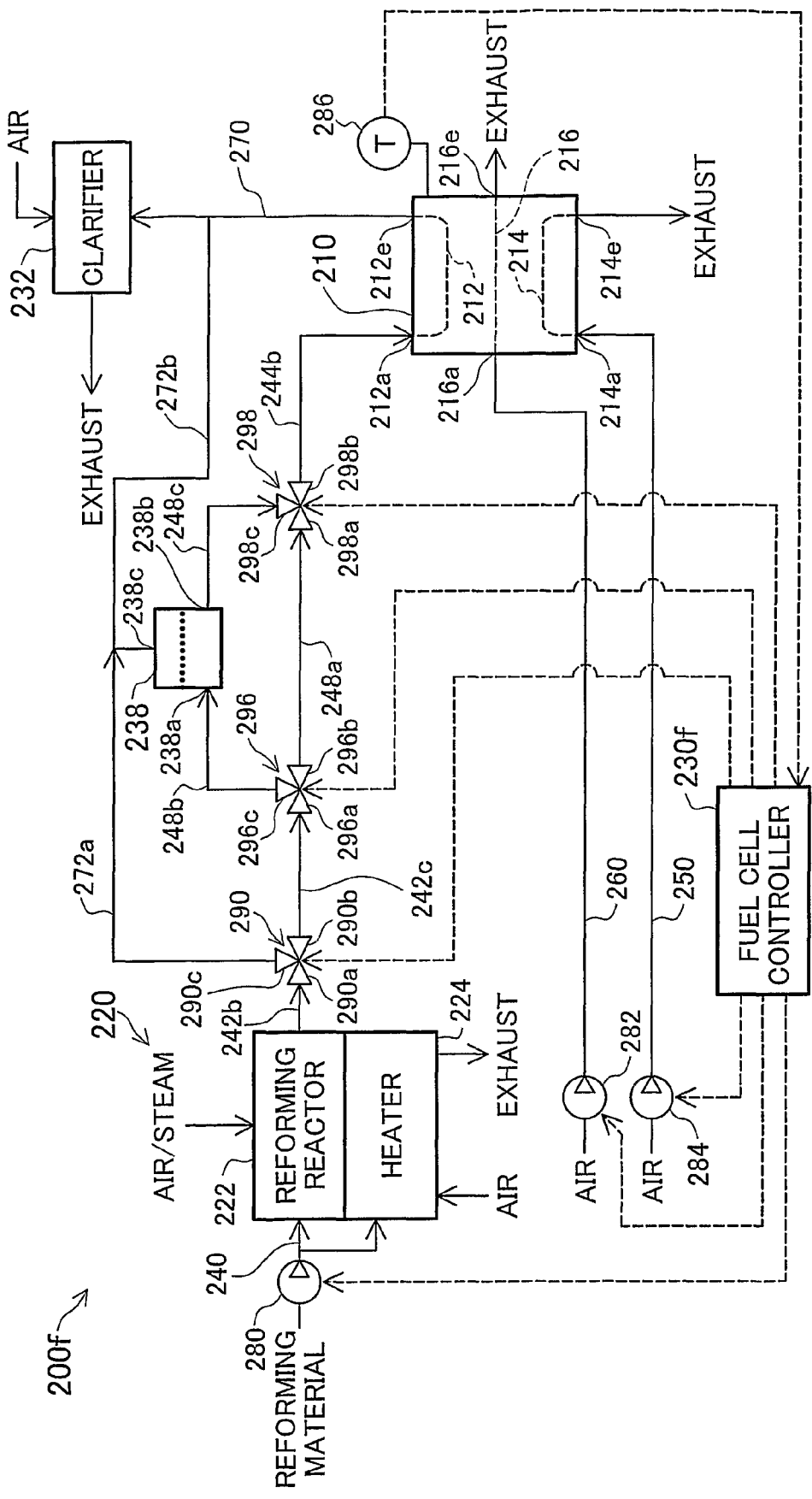
FIG. 11 is a schematic illustration showing the arrangement of a fuel cell system 200f of embodiment 7.

FIG. 11 is a schematic illustration showing the arrangement of a fuel cell system 200f of embodiment 7. The fuel cell system 200f differs from the fuel cell system 200e (FIG. 10) in embodiment 6 in that the former is equipped with the fuel gas bypass valve 290. In concrete terms, the reforming part 222 and the first port 292a of the first hydrogen separator bypass valve 296 are connected through two fuel gas pipings 242b and 242c and the fuel gas bypass valve 290. The third port 290c of the fuel gas bypass valve 290 is connected to a branch provided at the hydrogen exhaust piping 272b through the fuel gas bypass piping 272a. Other arrangements are virtually identical to those in embodiment 6.

The fuel cell controller 230f of embodiment 7 has a normal operation mode, a bypassing mode, and a hydrogen separation mode. In normal operation mode, the fuel gas bypass valve 290 is controlled similarly to the normal operation mode of embodiment 1. Also, the two hydrogen separator bypass valves 296 and 298 are controlled similarly to normal operation mode of embodiment 6. Because of this, fuel gas provided by the reforming part 222 is supplied to the anode channel 212 unchanged in normal operation mode.

In bypassing mode, the fuel gas bypass valve 290 is controlled similarly to the bypassing mode of embodiment 1. Also, the two hydrogen separator bypass valves 296 and 298 are controlled similarly to normal operation mode of embodiment 6. Because of that, fuel gas supplied by reforming part 222 is supplied to the clarifier 232 through the fuel gas bypass piping 272a and the hydrogen exhaust piping 272b in bypassing mode.

In hydrogen separation mode, the fuel gas bypass valve 290 is controlled similarly to normal operation mode of embodiment 1. Also, the two hydrogen separator bypass valves 296 and 298 are controlled similarly to the hydrogen separation mode of embodiment 6. Because of that, the fuel gas supplied by the reforming part 222 is supplied to the anode channel 212 after the hydrogen concentration is reduced by the hydrogen separator 238.

Figure 12:
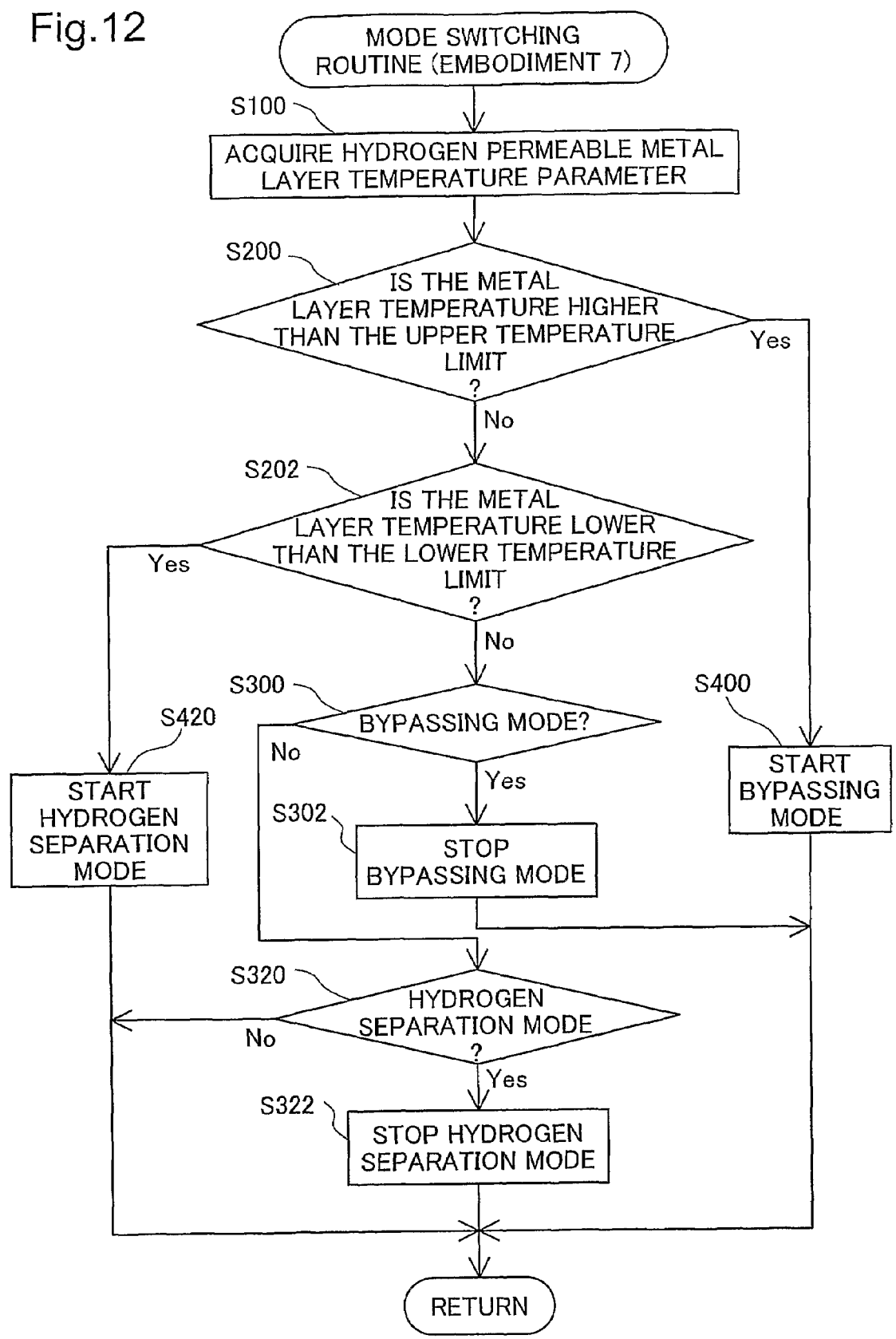
FIG. 12 is a flowchart showing the operation mode switching routine in embodiment 7.

FIG. 12 is a flowchart showing the operation mode switching routine in embodiment 7. The flowchart differs from the flowchart of embodiment 2 shown in FIG. 6 in that steps S320, S322, and S420 relating to the hydrogen separation mode are executed in place of the steps S310, S312, and S410 relating to the heating mode.

In embodiment 7, if it is determined in step S202 that the hydrogen permeable metal layer temperature is lower than the lower temperature limit, execution of hydrogen separation mode begins in step S420. After execution of the hydrogen separation mode begins, the routine ends.

Also, in embodiment 7, if it is determined in step S300 that the operation mode is not bypassing mode, the process moves to step S320. In step S320, it is determined whether the operation mode is hydrogen separation mode. If the operation mode is hydrogen separation mode, the operation mode is switched from hydrogen separation mode to normal operation mode in step S322. If the operation mode is not hydrogen separation mode, the routine ends.

If the hydrogen permeable metal layer temperature is lower than a predetermined lower temperature limit, in embodiment 7, hydrogen separation mode is executed, and fuel gas whose hydrogen concentration has been reduced is supplied to the anode channel 212. Because of that, it is possible to prevent degradation of the hydrogen permeable metal layer 416 (FIG. 3) similar to embodiment 6.

If the hydrogen permeable metal layer temperature is higher than a predetermined upper temperature limit, in embodiment 7, bypassing mode is executed, and supply of fuel gas to the anode channel 212 is stopped. Because of this, it is possible to suppress degradation of the hydrogen permeable metal layer 416 similar to embodiment 1.

In this manner, degradation of the hydrogen permeable metal layer 416 can be suppressed when the hydrogen permeable metal layer temperature deviates from a predetermined range in embodiment 7 as in embodiment 1. Embodiment 7 is preferable to embodiment 1 in that in the former, it is possible to suppress a decrease in the hydrogen permeable metal layer temperature using fuel gas heat when the hydrogen permeable metal layer temperature falls lower than a predetermined lower temperature limit. Also, embodiment 7 is preferable to embodiment 6 in that if the hydrogen permeable metal layer temperature increases above a predetermined upper temperature limit, the heat of the fuel gas is not supplied to the fuel cell 210, so increases in the hydrogen permeable metal layer temperature can be better suppressed. Embodiment 1 and embodiment 6 are preferable to embodiment 7 in that the arrangements of the fuel cell systems are simpler in the former.

H. Embodiment 8

Figure 13:
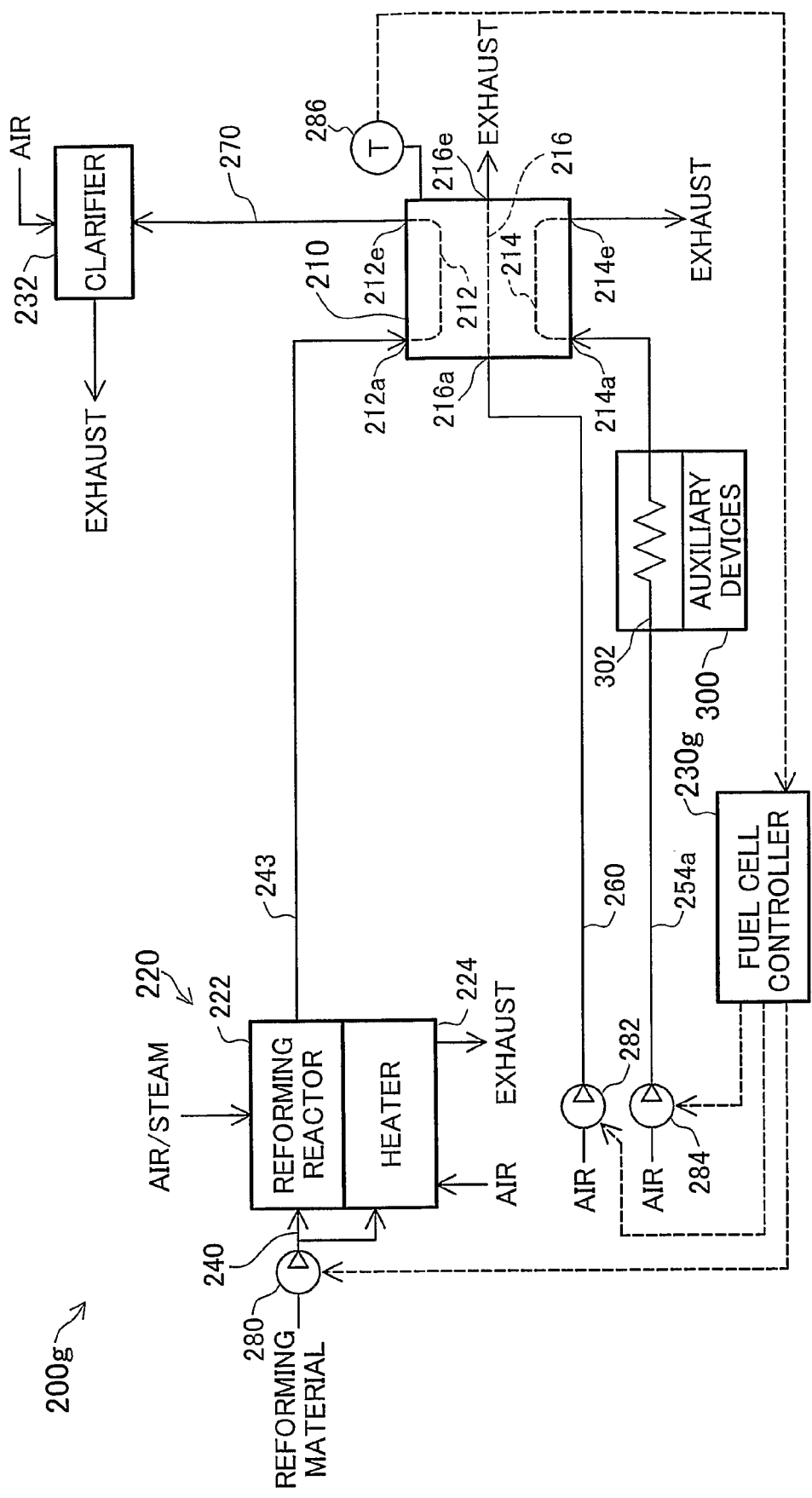
FIG. 13 is a schematic illustration showing the arrangement of the fuel cell system 200g in embodiment 8.

FIG. 13 is a schematic illustration showing the arrangement of the fuel cell system 200g in embodiment 8. The fuel cell system 200g differs from the fuel cell system 200 in embodiment 1 shown in FIG. 2 in that it is not equipped with a mechanism to divert fuel gas, though it is equipped with a heat exchanger 300 for heating the oxidizing gas. In concrete terms, the first air supply pump 284 is connected to a gas flow inlet 300a of the heat exchanger 300 through the first oxidizing gas piping 254a. The gas flow outlet 300e of the heat exchanger 300 is connected to the first cathode channel end 214a through the second oxidizing gas piping 254b. The gas flow inlet 300a and the gas flow outlet 300e of the heat exchanger 300 are connected by a gas channel 302 provided in the heat exchanger 300. The gas channel 302 is connected to auxiliary devices such as the pumps 280, 282, and 284, valves, and the like, whose temperature increases during operation of the fuel cell system 200g. The oxidizing gas is heated by the auxiliary devices when the former passes through the gas channel 302. Other arrangements are virtually identical to those in embodiment 1.

In this manner, in embodiment 8, it is possible to heat low temperature oxidizing gas colder than the operation temperature of the fuel cell, so it is possible to suppress local decreases in the temperature of the hydrogen permeable metal layer 416 (FIG. 3) due to introduction of low temperature oxidizing gas. Because of this, it is possible to prevent degradation of the hydrogen permeable metal layer 416 due to local temperature drops.

In embodiment 8, oxidizing gas is heated and supplied to the cathode channel 214, but in general, it is adequate if it is possible to heat the low temperature gas which is supplied to the fuel cell 210 and is colder than the operating temperature of the fuel cell 210. For example, even if cooling gas is heated and supplied to the coolant gas channel 216, it is possible to prevent degradation of the hydrogen permeable metal layer 416.

I. Embodiment 9

Figure 14:
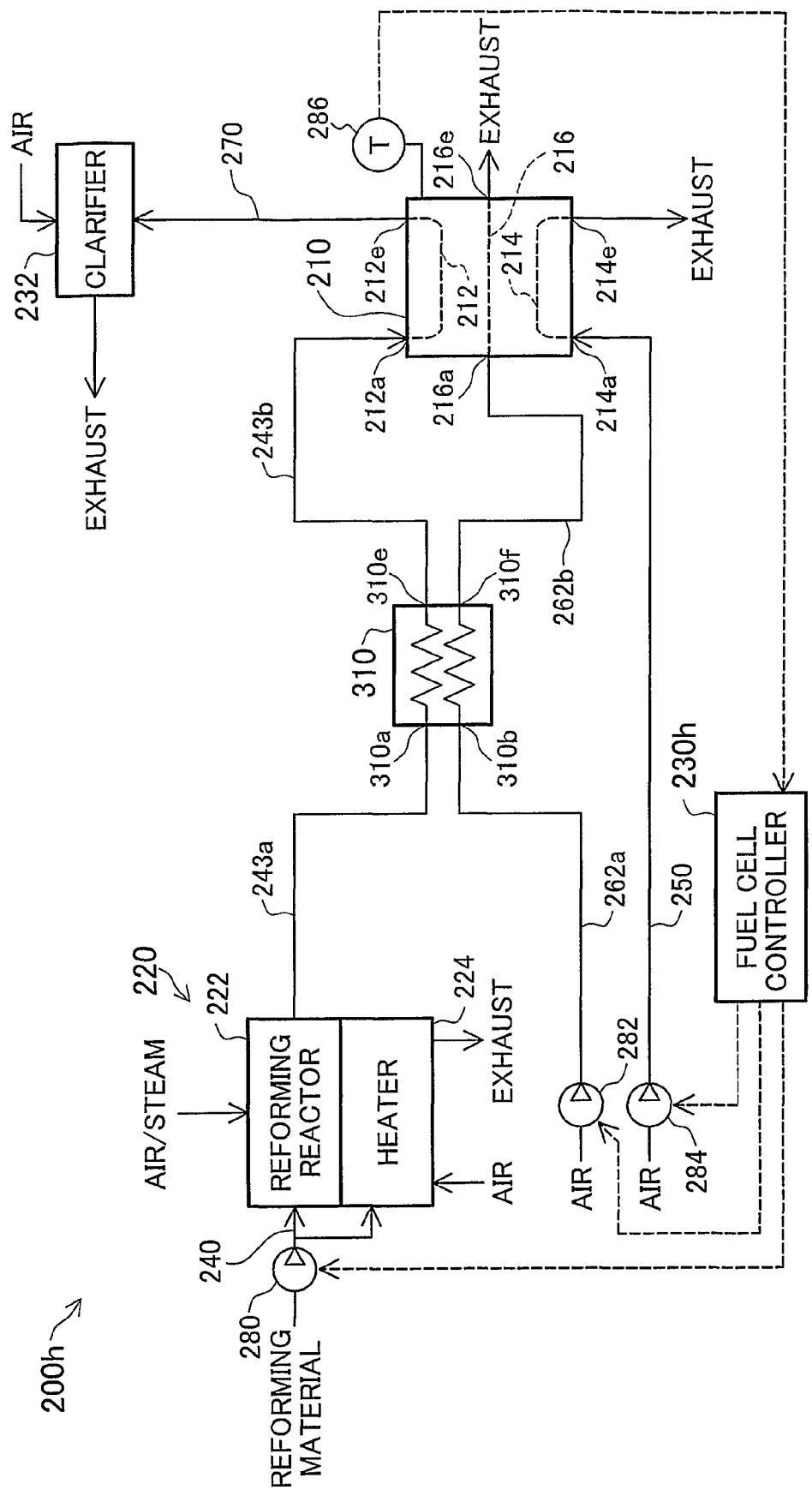
FIG. 14 is a schematic illustration showing the arrangement of the fuel cell system 200h in embodiment 9.

FIG. 14 is a schematic illustration showing the arrangement of the fuel cell system 200h in embodiment 9. The fuel cell system 200h differs from the fuel cell system 200g of embodiment 8 shown in FIG. 13 in that the former has a heat exchanger 310 for exchanging heat between the fuel gas and the cooling gas instead of the heat exchanger 300 for heating the oxidizing gas. In concrete terms, the reforming part 222 is connected to a gas flow inlet 310a of the heat exchanger 310 through a first fuel gas piping 243a. A gas flow outlet 310e of the heat exchanger 310 is connected to a first anode channel end 212a through a second fuel gas piping 243b. The second air supply pump 282 is connected to a second gas flow inlet 310b of the heat exchanger 310 through a first cooling gas piping 262a. A second gas flow outlet 310f of the heat exchanger 310 is connected to a first coolant gas channel end 216a through a second cooling gas piping 262b. Other arrangements are virtually identical to those in embodiment 8.

The heat of the cooling gas and fuel gas supplied to the heat exchanger 310 is exchanged while the gases are passing through the heat exchanger 310. Through this fuel gas and cooling gas heat exchange, the fuel gas is cooled. This heat exchange also heats the cooling gas.

In this manner, in embodiment 9, high temperature fuel gas beyond the operating temperature of the fuel cell 210 is cooled, and the low temperature cooling gas below the operating temperature of the fuel cell 210 is heated. Because of this, it is possible to suppress both local temperature rises and local temperature drops in the hydrogen permeable metal layer 416 (FIG. 3), so degradation of the hydrogen permeable metal layer 416 can be prevented. Embodiment 9 is preferable to embodiment 8 in that it is possible to suppress both local temperature rise and local temperature drop in the hydrogen permeable metal layer 416. Embodiment 8, however, is preferable to embodiment 9 in that the arrangement of the fuel cell system is simpler.

In embodiment 9, the fuel gas is cooled, and the cooling gas is heated through fuel gas and cooling gas heat exchange, but in general, it is adequate if high temperature gas beyond the operating temperature of the fuel cell 210 can be cooled, and low temperature gas below the operating temperature of the fuel cell 210 can be heated. For example, the fuel gas may be cooled and the oxidizing gas may be heated by heat exchange between fuel gas and oxidizing gas. Also, the fuel gas may be cooled by anode off gas and exhaust gas from the cooling channel, and the oxidizing gas and cooling gas heated by some other heat source.

J. Variants

The invention is not limited to the embodiments and modes described above, and may be reduced to practice in various other modes without departing from the scope and spirit thereof, such as the following variants, for example.

J1. Variant 1:

In embodiment 4 and embodiment 5 described above, a bypass mechanism is provided to divert fuel gas in cases where the hydrogen permeable metal layer temperature deviates from a predetermined temperature range, but instead, the temperature of the gas supplied to the fuel cell may be adjusted when the hydrogen permeable metal layer temperature deviates from the predetermined temperature range without providing a bypass mechanism. If the hydrogen permeable metal layer temperature is lower than the lower temperature limit, degradation of the hydrogen permeable metal layer can be prevented by heating the oxidizing gas, for example. Also, if the hydrogen permeable metal layer temperature is higher than the upper temperature limit, degradation of the hydrogen permeable metal layer can be prevented by heating the fuel gas. In this case, heating of the gas supplied to the fuel cell may be carried out similar to in embodiment 4, for example. Also, cooling of the gas supplied to the fuel cell may be carried out similar to in embodiment 5, for example.

J2. Variant 2:

In embodiment 2 to embodiment 5, there is either a heating part or a cooling part for the hydrogen permeable metal layer to prevent degradation of the hydrogen permeable metal layer, but this heating part and cooling part may both be used in one fuel cell system. For example, the hydrogen permeable metal layer can be heated similar to in embodiment 4 if the hydrogen permeable metal layer temperature is lower then a predetermined lower temperature limit, and the hydrogen permeable metal layer may be cooled similar to in embodiment 5 if the hydrogen permeable metal layer temperature is higher than a predetermined upper temperature limit.

J3. Variant 3:

In embodiment 2 to embodiment 5, the supply of oxidizing gas and cooling gas to the fuel cell is not adjusted, but it is possible to facilitate decreases or increases in the hydrogen permeable metal layer temperature by adjusting supply of the gases. It is possible to facilitate an increase in the hydrogen permeable metal layer temperature by decreasing the quantity of cooling gas supplied to the fuel cell, for example, when the hydrogen permeable metal layer temperature is lower than a predetermined lower temperature limit. Also, it is possible to facilitate a decrease in the hydrogen permeable metal layer temperature by increasing the quantity of cooling gas supplied to the fuel cell, for example, when the hydrogen permeable metal layer temperature is higher than a predetermined upper temperature limit.

J4. Variant 4:

In the above embodiments, reformed gas produced by a reformer is used as the fuel gas, but other, non-reformed gases may also be used as the fuel gas. Hydrogen gas supplied from a high-pressure hydrogen tank or hydrogen storage alloy may be used, for example, as a non-reformation fuel gas.

The invention claimed is:

1. A fuel cell system comprising:
a fuel cell having an electrolyte, a cathode provided at one side of the electrolyte, an anode with a hydrogen permeable metal layer provided at the other side of the electrolyte, a cathode channel for supplying oxidizing gas to the cathode, an anode channel for supplying fuel gas containing hydrogen to the anode;
a hydrogen permeable metal layer degradation prevention section configured to reduce a partial pressure of hydrogen in the anode channel for preventing degradation of the hydrogen permeable metal layer;
a temperature parameter acquisition section configured to acquire a parameter relating to a temperature of the hydrogen permeable metal layer; and
a fuel cell controller for controlling an operation state of the fuel cell system, wherein the fuel cell controller has a degradation prevention mode for causing the hydrogen permeable metal layer degradation prevention section to operate when the temperature of the hydrogen permeable metal layer represented by the temperature parameter deviates from a predetermined temperature range.

2. A fuel cell system according to claim 1, wherein the hydrogen permeable metal layer degradation prevention section includes a gas supply reduction section configured to reduce a partial pressure of hydrogen in the anode channel by decreasing a supply of the fuel gas to the anode channel.

3. A fuel cell system according to claim 1, wherein the hydrogen permeable metal layer degradation prevention section includes:
a hydrogen separation device separating hydrogen in fuel gas; and
a hydrogen concentration reduction section configured to reduce a partial pressure of hydrogen in the anode channel by supplying fuel gas whose hydrogen concentration has been decreased by the hydrogen separation device to the anode channel.

4. A fuel cell system according to claim 3, wherein the hydrogen permeable metal layer degradation prevention section further comprising:
a gas supply reduction section for decreasing a partial pressure of hydrogen in the anode channel by decreasing a supply of the fuel gas to the anode channel; and
the fuel cell controller configured to cause the hydrogen concentration reduction section to operate when a temperature of the hydrogen permeable metal layer represented by the temperature parameter is below a predetermined lower temperature limit, and to cause the gas supply reduction section to operate when a temperature of the hydrogen permeable metal layer represented by the temperature parameter is above a predetermined upper temperature limit.

5. A fuel cell system according to claim 1, wherein the hydrogen permeable metal layer degradation prevention section includes a low hydrogen concentration gas supply section configured to decrease a partial pressure of hydrogen in the anode channel by supplying gas with a hydrogen concentration lower than the fuel gas to the anode channel.

6. A fuel cell system according to claim 1, further comprising:
a temperature increase facilitation section configured to facilitate a temperature increase in the hydrogen permeable metal layer; and
a temperature increase mode for causing the temperature increase facilitation section to operate when a temperature of the hydrogen permeable metal layer represented by the temperature parameter is below a lower temperature limit of the predetermined temperature range.

7. A fuel cell system according to claim 6, wherein
the fuel cell includes a heating channel, which is a gas channel for which an oxidizing catalyst is provided, and
the temperature increase facilitation section includes a hydrogen permeable metal layer heating section configured to heat the hydrogen permeable metal layer by supplying gas including a combustible component and a oxidizing component to the heating channel.

8. A fuel cell system according to claim 1, further comprising a temperature decrease facilitation section configured to facilitate a decrease in temperature of the hydrogen permeable metal layer, wherein
the fuel cell controller includes a temperature decrease mode for causing the temperature decrease facilitation section to operate when a temperature of the hydrogen permeable metal layer represented by the temperature parameter is above an upper temperature limit of the predetermined temperature range.

9. A fuel cell system according to claim 1, further comprising a reformer generating fuel gas containing hydrogen from reforming material having hydrogen elements, wherein
the fuel cell controller causes the hydrogen permeable metal layer degradation prevention section to operate while maintaining operation of the reformer.

* * * * *